(12) United States Patent (10) Patent No.: US 7,340,450 B2
Sugahara et al. (45) Date of Patent: Mar. 4, 2008

(54) DATA SEARCH SYSTEM AND DATA SEARCH METHOD USING A GLOBAL UNIQUE IDENTIFIER

(75) Inventors: Taro Sugahara, Tokyo (JP); Hidenori Shimizu, Tokyo (JP); Fumitoshi Ukai, Tokyo (JP); Hironori Bouno, Tokyo (JP); Marc McEachern, Tokyo (JP); Shinya Nakagawa, Tokyo (JP); Kiyotaka Otsuji, Kamakura (JP); Toshiki Iso, Yokosuka (JP); Hiroki Suzuki, Yokohama (JP); Shoji Kurakake, Yokohama (JP); Toshiaki Sugimura, Yokohama (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 10/800,038

(22) Filed: Mar. 15, 2004

(65) Prior Publication Data

US 2004/0244039 A1 Dec. 2, 2004

(30) Foreign Application Priority Data

Mar. 14, 2003 (JP) ............................. 2003-069522

(51) Int. Cl.
*G06F 7/00* (2006.01)
(52) U.S. Cl. .................. 707/3; 707/4; 707/10
(58) Field of Classification Search ................ 707/1–3, 707/4, 10
See application file for complete search history.

(56) References Cited

U.S. PATENT DOCUMENTS

2002/0152215 A1* 10/2002 Clark et al. .................... 707/10
2003/0084035 A1* 5/2003 Emerick, III ................... 707/3
2003/0140028 A1* 7/2003 Sjogren et al. ................. 707/1
2003/0195803 A1* 10/2003 Ketonen ...................... 705/14
2003/0217052 A1* 11/2003 Rubenczyk et al. ........... 707/3
2004/0236736 A1* 11/2004 Whitman et al. .............. 707/3
2006/0117003 A1* 6/2006 Ortega et al. .................. 707/4

FOREIGN PATENT DOCUMENTS

| JP | 11-53581 | 2/1999 |
|---|---|---|
| JP | 11-203835 | 7/1999 |
| JP | 2002-108892 | 4/2002 |
| JP | 2002-373174 A | 12/2002 |

* cited by examiner

*Primary Examiner*—Cheyne D Ly
(74) *Attorney, Agent, or Firm*—Lowe Hauptman Ham & Berner, LLP

(57) ABSTRACT

Data and/or services associated with a given object are easily searched by using a search system having a global unique object identifier, a metadata store, an input for entering the global unique identifier, a metadata reader for reading a set of metadata including the input global unique identifier from the metadata store, and a metadata search engine for searching for specific metadata by searching for a specific description sentence included in each metadata of the read set of metadata.

9 Claims, 15 Drawing Sheets

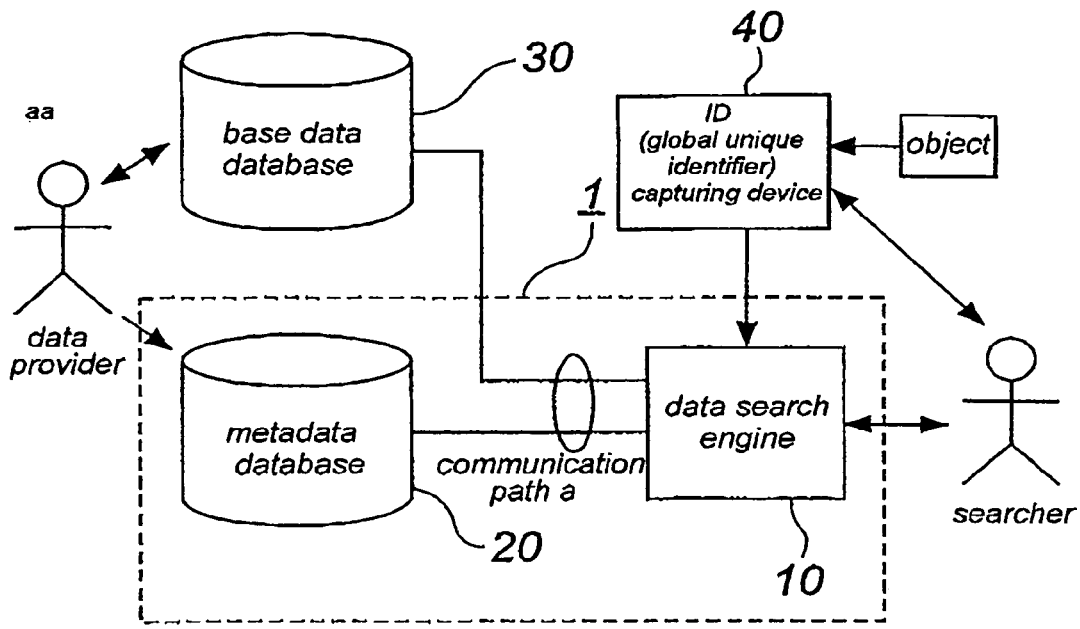
Fig. 1
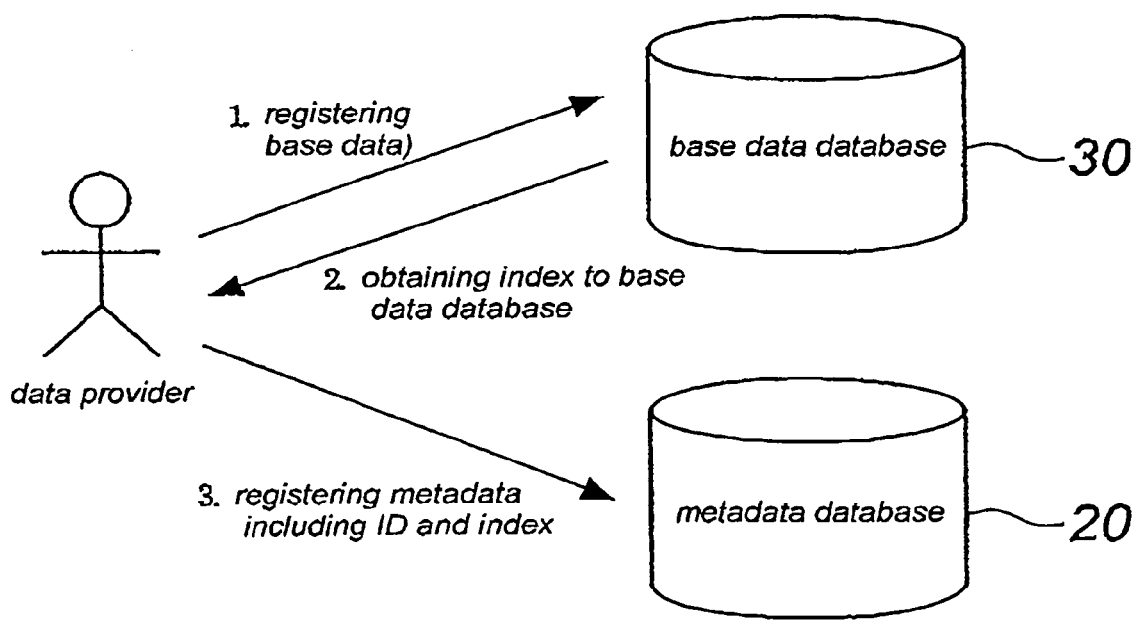
Fig. 2    registration of base data and metadata

- ID (global unique identifier)
- index on database
- description sentence
- type format of metadata

*Fig. 4A* metadata for a static data

- cameraA
- 1
- "camera A / P_P / brochure" ("brochure of camera A")
- PDF metadata for a program

- printerB
- 2
- "printer B / P_M / X:PDF / P_O / print" ("print X:PDF with printer B")
- PDF -> VOID

*When representing a type, X -> Y means that type X is the type of input and type Y is the type of output. Type VOID means that there is no input or output.

examples of metadata

*Fig. 4B* tree expression of metadata set example of display of search screen (continued to Figure 6B)

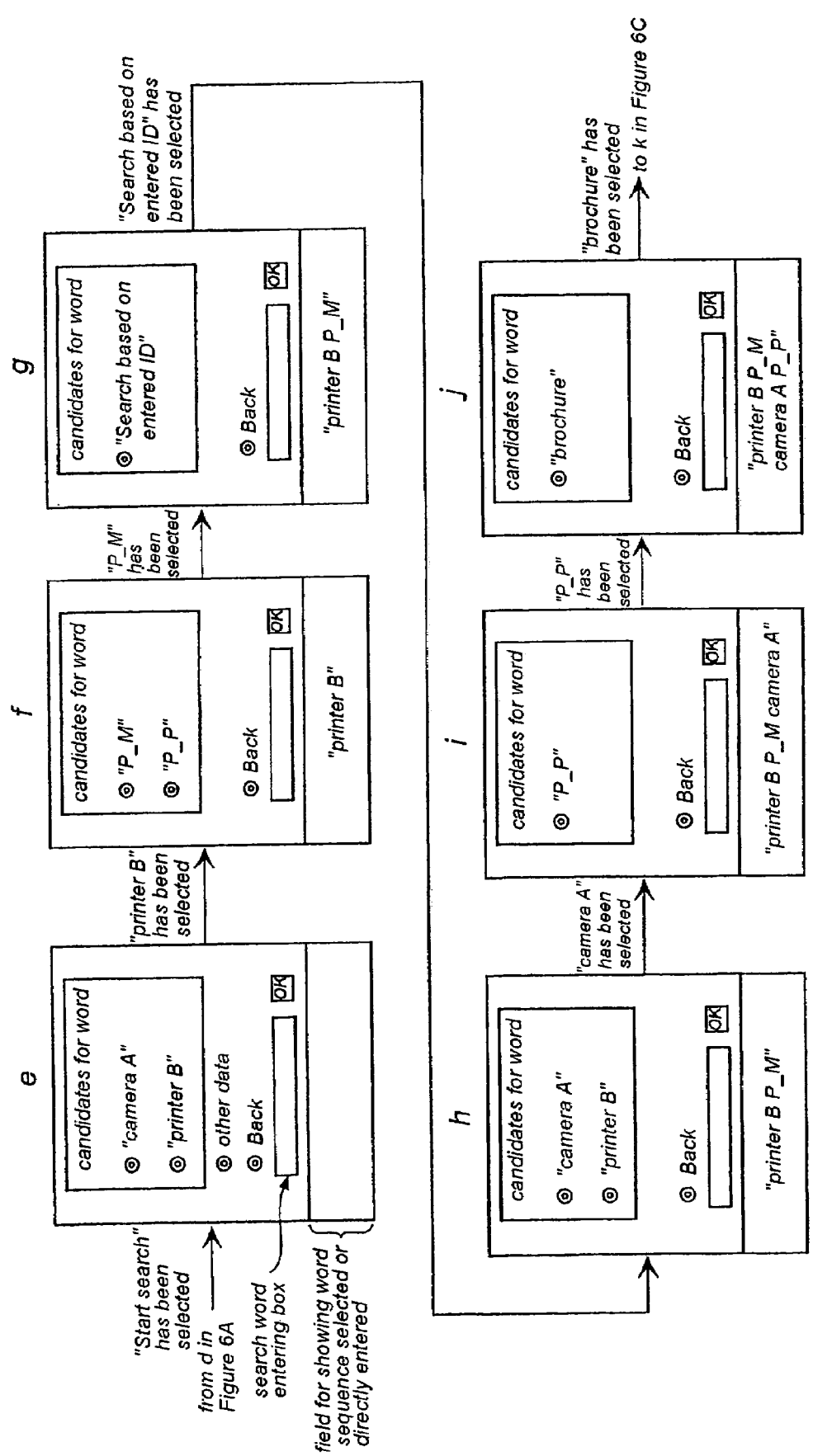
Fig. 6B   example of display of search screen (continued to Figure 6C)

example of display of search screen search flow data search

ID entering operation operation for combining generated path and tree

DATA SEARCH SYSTEM AND DATA SEARCH METHOD USING A GLOBAL UNIQUE IDENTIFIER

TECHNICAL FIELD OF THE INVENTION

The present invention relates to a system for and method of searching for data and services based on requests from data and/or service users.

BACKGROUND ART

Conventionally, in order to search for data and/or services relating to a target article, a searcher enters a keyword relating to the article or makes a selection among the keywords presented by the system. This applies to the case where metadata representing the substance of a data and/or a service is registered in association with the base data beforehand and is used to search for the associated base data. Therefore, with such a keyword-based search system, there is a drawback in that it is sometimes difficult to select optimum keywords, i.e., the keywords for best narrowing down to the target data, since there may exist many keywords to be selected for searching for the target data especially at the initial stage of searching, resulting in insufficient searching.

Alternatively, an operating system which supports GUI (Graphical User Interface) such as Microsoft Windows (Registered Trademark) enables interaction between two objects by performing drag-and-drop on icons. The interaction includes moving a file into a folder and displaying data by using an application. The examples are disclosed in JP-A-11-53581 and JP-A-11-203835. In such conventional methods that cause interaction between two objects by means of drag-and-drop, the operation activated by the drag-and-drop is uniquely determined, allowing no selection by the user. In other words, with the drag-and-drop scheme in the conventional systems, when one or more data and/or programs are associated with each of one or more objects, it is not easy to select and execute any desired operation by combining such data and services each other and searching these combinations.

SUMMARY OF THE INVENTION

In view of these problems of the conventional technologies, the present invention relates to a new and improved data search system for and method of providing a more efficient search of data or a service (hereinafter referred to as program, since the substance of a service is a program) that is associated with a certain target "article." The present invention further provides a new and improved search system for and method of allowing for an easy search of combined data and/or programs when one or more data and/or programs are associated with each of one or more articles.

In the present specification, an "article" includes an article associated with a physical entity and a conceptual article not necessarily associated with a physical entity. In order to clearly express this idea, both of these articles are referred to as "object." It is possible to virtually attach data and/or a program to an object. A global unique identifier, hereinafter referred to as ID, is an identifier assigned to an object for identifying the object. A metadata, which has an ID of an object, an index to data, a description sentence of data and a data type as its attributes, associated through its ID with an object to which the ID is assigned, and is associated with its corresponding data through its index to data (hereinafter referred to as data index or simply index). A data description sentence is a sequence of one or more words representing the subject matter or the like of the associated (i.e., corresponding) data. When data is a program, the data type is the types of its input (argument) and output (returned value) of the program. When data is static data, the data type is its data format.

On assigning an ID to an object, the ID can be set to the code itself which is read from the object using an ID capturing device. Alternatively, the code read from the object, which is not employed as the ID, can be converted by a certain arrangement to the ID (that is, the ID is searched for based on the code). Furthermore, the ID can be obtained through two or more stages of code conversion instead of a single stage. Moreover, obtaining the ID through the code conversion is actually often more convenient. How the ID is finally obtained from the read code may be determined at the convenience of the whole system which uses the ID. Though an ID is sometimes explained to be read directly from the object, hereinafter for simplicity, it should be noted, however, that in reality the ID of an object is finally obtained through one or more conversion (search) stages of the code read from the object. Therefore, "reading an ID" herein means not only reading the ID itself from the object but also obtaining in any way the ID from the code which is read from the object, but which is not the ID itself.

Furthermore, a converter for finally obtaining an ID by converting a code read from an object can be included in each capturing device and the devices connected thereto and using captured IDs as described above when the whole system that assigns and uses IDs is of small scale, such as the system having only a small number of capturing devices. When the system is large to some extent, a server or the like which receives a request and performs the conversion can actually be provided in the network or the like, since performing the conversion in each device causes the conversion table to be large and causes serious problems in management, such as registering, deleting and modifying IDs or the like. In addition, such a server can be a centralized server or distributed so as to share the burden of functions by the stage of the conversion or other aspect. Furthermore, the distributed conversion can be performed in which a code specific to the medium of an object the capturing arrangement has read out from the object is converted to another form that is relatively general-purpose and then transferred to the above mentioned server for conversion to perform further conversion.

The word "data" herein refers to both the case of program data and non-program data and the case of program data and non-program data, in which the non-program data is data such as text data and image data and will hereinafter be referred to as static data for distinguishing it from a program.

A data search system or data search method according to a preferred embodiment of the present invention is configured to search for metadata relating to an "object" based on a global unique identifier for identifying the "object" in order to search for target data and can take the several aspects as follows.

In a first aspect, metadata includes at least a global unique identifier, a data index and a description sentence of a base data, the unique identifier being an identifier for identifying a specific object, each of the metadata being associated with corresponding base data by the data index and being associated with the object by the global unique identifier, and the system comprising: metadata store for storing metadata; an input arrangement for entering the global unique identifier;

a metadata reader for reading out a set of metadata including the entered global unique identifier from the metadata storing means; and a metadata searcher for searching for a specific metadata by searching the read out set of metadata for a specific description sentence.

According to the first aspect, by entering a global unique identifier associated with an object, only the metadata including the global unique identifier can be obtained, which relieves a searcher from hesitating in the selection of a suitable keyword to be entered first, unlike conventional search systems. Therefore, the searcher can search for base data associated with an object more efficiently.

According to a second aspect, a plurality of the same global unique identifiers are included in a plurality of metadata of the first aspect. According to the second aspect, even if a plurality of data are associated with a same object, those plurality of data can be located during the same search procedure.

A third aspect is the combination of the first or second aspect and an arrangement for capturing (a) the data index from the specific metadata and (b) the base data corresponding to the specific metadata from the data index. As a result of the third aspect, once a metadata is located, the corresponding base data can immediately be located from the index included in that metadata.

A fourth aspect, which corresponds to what the second aspect is seen as a method invention, comprises the steps of entering a global unique identifier, capturing a set of metadata including the entered global unique identifier, and searching for a first specific metadata based on a description sentence included in each metadata of the obtained set of metadata.

In a fifth aspect, in addition to the fourth aspect, a metadata description sentence is a sequence of words. The fifth aspect further comprises the steps of: a. holding the captured set of metadata and obtaining and presenting words at the beginning of description sentences included in the set; b. selecting and entering one word from the presented words; c. holding only metadata having a description sentence including a word matching the entered word among the held metadata; d. obtaining and presenting a word from a description sentence of the held metadata, the obtained and presented word being at the position in the sequence next to the matching word; e. repeating steps b through d until a word obtained at step d is the last word of any description sentence of the held metadata; and f. presenting a metadata among the held metadata the description sentence having the last word at step e as its last word.

According to the fifth aspect, a searcher can reach a specific metadata steadily and quickly among a set of metadata which include the global unique identifiers by entering words in sequence which are included in the description sentence of the specific metadata. In other words, unlike a conventional search method, an efficient search can be achieved without (1) confusion over which keyword to choose or (2) inefficiency such as entering erroneous keywords.

A sixth aspect is the fifth aspect further including, after step f, the steps of: g. making a selection between determining that the metadata presented at step f be the first specific metadata and further performing steps d, e, and f; and h. repeating step g until it is determined that the metadata presented at by step h is the first specific metadata.

According to the sixth aspect, on locating a metadata which includes a certain description sentence, a search is continued for a description sentence which includes that certain description sentence at its beginning.

In a seventh aspect, each metadata includes (1) at least a global unique identifier, (2) a data index and (3) a description sentence of a base data. The global unique identifier is an identifier for identifying a specific object, and each of the metadata is associated with corresponding base data by the data index and is associated with the object by the global unique identifier. The metadata further includes a type of the associated base data, and a plurality of metadata are capable of including the same global unique identifier. The description sentence is a sequence of words of the description sentence capable of being represented as a variable of a specific data type. A first specific metadata including a specific description sentence is searched for from a set of metadata associated with a first global unique identifier. The seventh aspect includes the steps of: entering the first global unique identifier and a second global unique identifier; specifying a combination search of metadata including the first global unique identifier and metadata including the second global unique identifier; capturing a set of metadata including the first global unique identifier or the second global unique identifier; performing steps a through e of the fifth aspect with a set of metadata including the first global unique identifier regarded as the set of captured metadata as in the fourth aspect; if the word selected at the step b is the variable (first variable): presenting the fact that a metadata combination search is selectable; and selecting the combination search of metadata; and if the metadata combination search is selected: capturing a set of metadata (second set of metadata) including the first or second global unique identifier and including the same data type as the first variable; and searching for a second specific metadata based on a description sentence included in the respective metadata in the second set of metadata.

According to the seventh aspect, a search can be realized in which one or more metadata associated with a plurality of global unique identifiers respectively are combined. Since metadata can be combined by a variable, flexible combinations can be realized. Furthermore, the first global unique identifier and the second global unique identifier can be the same. In this case, a search can be done in which a plurality of metadata, which are associated with the same global unique identifier, are combined.

An eighth aspect is a configuration in which, in the seventh aspect, steps a through f in the fifth aspect are performed with the second set of metadata regarded as the captured set of metadata in the fourth aspect. In the eighth aspect there is a step (i) of selecting between determining that the metadata presented at the step f is the second specific metadata and further performing the steps d, e, and f; and j. repeating step i until it is determined that the presented metadata is the second specific metadata. According to the eighth aspect, just like the sixth aspect, when metadata including a certain description sentence is located, a search is continued for the metadata which has the description sentence including that certain description sentence at its beginning.

A ninth aspect further includes, in the seventh or eighth aspect, the steps of: k. if the metadata combination search is selected, temporarily storing metadata which is held (held metadata) and the first variable; and if the second specific metadata is located: l. reading out the temporarily stored held metadata and the first variable; and m. performing steps a through f in the fifth aspect, with the step a in the fifth aspect regarded as capturing and presenting a word in a description sentence at the position next to the word which is represented by the first variable; the description sentence from which the word is captured and presented is included in respective metadata in the held metadata.

A tenth aspect is a configuration in which, in step m of the ninth aspect, n. a selection is made between determining that metadata presented at the step f is the first specific metadata and further performing steps d, e and f; and o. Step n is repeated until it is determined that the presented metadata is the first specific metadata.

An eleventh aspect is the configuration further comprising, in any one of the seventh through tenth aspects, the steps of: displaying a first icon corresponding to the first global unique identifier; and displaying a second icon corresponding to the second global unique identifier, wherein the step of specifying the metadata combination search comprises dragging-and-dropping one of the first icon and second icon onto the other.

According to the eleventh aspect, a search is specified in which metadata associated with one or more objects are combined, that is, base data are combined by a simple operation of dragging-and-dropping an icon.

REFERENCE NUMERALS AND SIGNS ARE 10 data search engine
20 metadata database
30 base data database
100 user I/F section
120 input handler
140 list display section
200 search operation section
220 list generator
230 metadata search section
232 tree generator
234 metadata search engine
236 metadata reader
300 data capturing section

BRIEF DESCRIPTION OF THE DRAWING

FIG. 1 is a conceptual diagram showing a configuration of a data search system according to one embodiment of the invention.

FIG. 2 is an outline of steps for registering data and metadata according to one embodiment of the invention.

FIG. 4A includes a format of metadata according to one embodiment of the invention.

FIG. 4B is one example of metadata according to one embodiment of the invention.

FIGS. 6A, 6B and 6C, together, form a diagram of exemplary search screen displays during a search operation according to one embodiment of the invention.

DETAILED DESCRIPTION OF THE DRAWING

Figure 3:
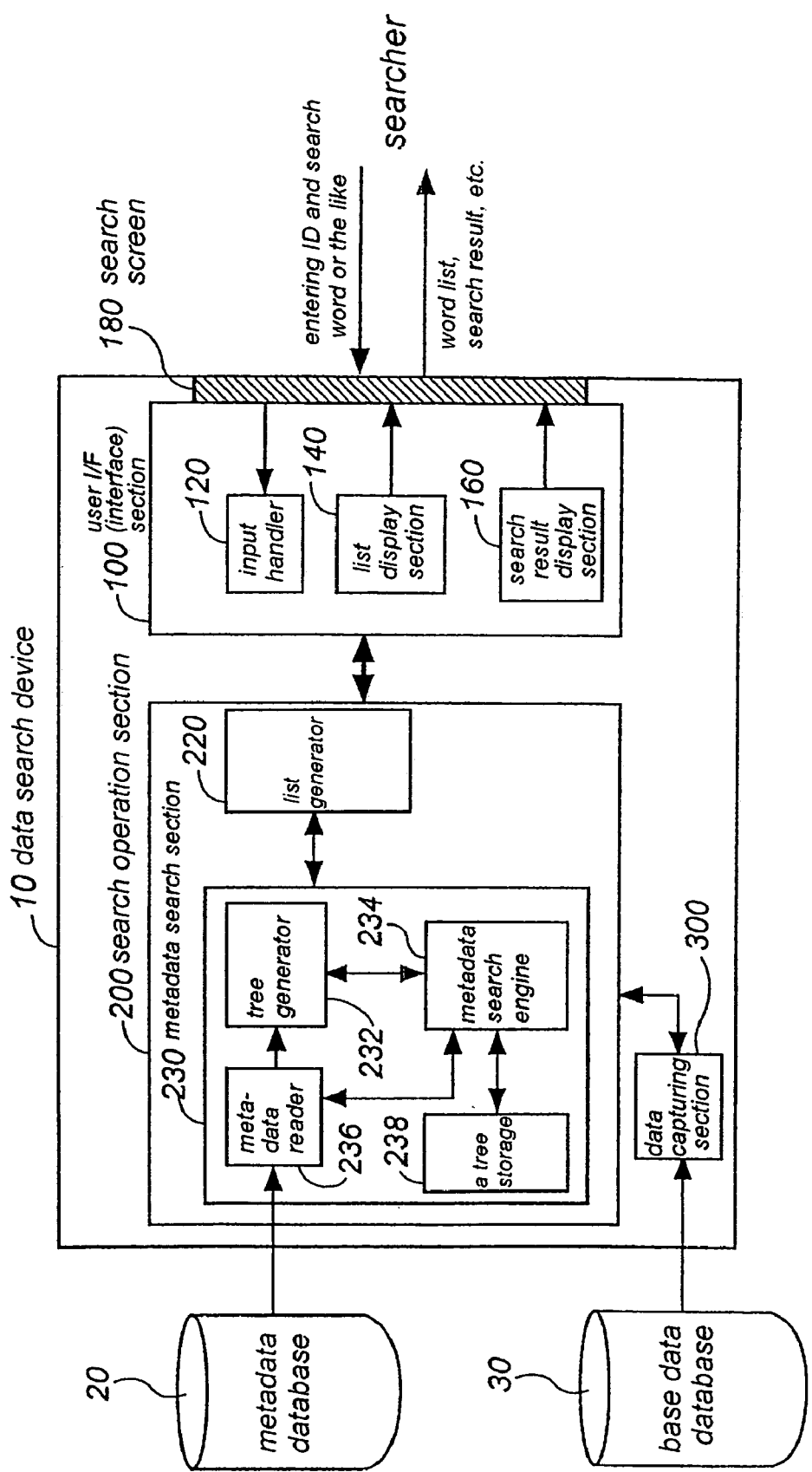
FIG. 3 is a diagram of a block configuration of a data search engine according to one embodiment of the invention.

A conceptual diagram of components of a data search system 1 is shown in FIG. 1. The data search system 1 includes a data search device 10 and a metadata database 20 for storing metadata as the components. As shown, the data search device 10 is connected to the metadata database 20 through a communication channel a. The data search device 10 can be also connected to a base data database 30 for storing base data through the communication channel a. Therefore, this system may be constructed as an independent network system such as a LAN and a WAN or as a part of an existing network system such as Internet. The communication channel a may be an arbitrary existing transmission means such as a LAN cable or an unwired or wired public network.

A global unique identifier capturing device 40 is a device for reading a global unique identifier (ID). The global unique identifier capturing device is called ID capturing device hereinafter. An ID can be appended to an object as a tag such as a barcode. In this case, the ID capturing device 40 may be a barcode reader for obtaining an ID by reading a barcode containing the ID. The ID capturing device 40 may be adjusted to display the read ID.

As described above, data herein includes either data or programs or both of data and program. It should be noted that a data is a sequence of symbols such as characters and is written in some data format (such as plain text, Microsoft Word (registered trademark) file format and JPEG file format). A program is a function for performing a service and is a program for receiving inputs of zero or more data (arguments) and outputting zero or one data (return value). A data provider is a person who provides data. A searcher is a person who searches for base data (that is, a user of the data search system 1).

A data stored in the base data database 30 can be retrieved by specifying the index corresponding thereto. For example, when "1" is specified as an index, data A corresponding to Index 1 can be retrieved. When "2" is specified as an index, data B corresponding to Index 2 can be retrieved. A data may be distributed on Internet. The index in that case is a URL (Uniform Resource Locator).

The metadata database 20 is a storage means for storing metadata. The configuration of metadata is shown in FIG. 4A. The description sentence of a data will simply be referred to as description sentence hereinafter. The fact that a metadata includes the data type means that metadata has the data type as the attribute. FIG. 4B shows a concrete example of metadata. In FIG. 4B, an ID is written in text like "camera A" but may be written in symbols such as numerals like JAN:4987244103024 (This example follows the actually used format of product common code called JAN code. Refer to http://www.dsri-dcc.jp/company/jan/ for JAN code if necessary).

One same ID can be associated with a plurality of data. For example, an ID of "camera A" can be associated with a plurality of data such as data of "brochure of camera A", and/or data of "dealers of camera A". This can be handled by including a same ID (such as the ID of "camera A") in metadata provided for each of the plurality of data.

A description sentence can be freely described as a phrase which relates to the data and is delimited by word. In the present specification and the appended drawings, the delimiter is represented by a symbol "/". The position of the delimiter may be determined by the data provider or may be automatically determined by using any method such as morphological analysis. With the language in which a sentence is written with delimited by word, such a break point between words may be employed as the delimiter of the present embodiment.

Since the description sentences below are based on Japanese grammar, and thus translation into other language may make them indefinite, explanations on the word order of the description sentences and the words having the grammatical functions are provided below. Notations for the embodiment are also explained.

A description sentence, "printer B/の/brochure/を/request" (Request a brochure of printer B.), will be taken as an example for the explanation. Under Japanese grammar, an object ("printer B") is presented first and a verb (request) is presented after that. In addition, under Japanese grammar, a grammatical case is represented by a particle. A particle indicates the grammatical role of the word just before the particle by placing a particle of possessive case, "の", after a noun of possessive case and placing a particle representing objective case, "を", after an object, Furthermore, in a description sentence, "Manual/を/printer B/で/print" (Print a manual with printer B.), a particle, "で", is used for indicating that the word just before the particle is a device, method or tool.

Since the order of words is significant in the explanation of the embodiment below and since words other than nouns and verbs which indicate grammatical functions, such as the particles as explained above, are also treated on the same plane as verbs and nouns, the description sentences taken as examples are indicated in accordance with the following rules:

1. the word order conforms to that of Japanese; a verb is placed after an object; and
2. with respect to particles, a symbol indicating a particle is placed after the word the case of which the particle is to indicate (i.e., the same position of the article in Japanese) in consideration of the fact that some languages have no particles. Symbol P_P is used for the particle representing possessive case, symbol P_O is used for the particle representing objective case, and symbol P_M is used for he particle representing a device, method or tool.

A description sentence can include a variable having a type. A description sentence of a metadata corresponding to a data (program) associated with a given object can be a description sentence, "X:HTML/P_O/print" ("print X:HTML") where X is a variable. In this case, X:HTML means that the variable X has the type HTML. In other words, the description sentence, "X:HTML/P_O/print" means "print data in HTML format passed as variable X". Here, the description sentence of the metadata of the same data type as the type of the variable X can be associated with the variable X.

In the present example, when a base data in HTML format representing "brochure of camera A" is associated with a specific object "camera A", the description sentence of the metadata corresponding to this base data can be associated with the variable X. When the description sentence of the metadata is, for example, "camera A/P_P/brochure" ("brochure of camera A"), this association applied to the description sentence, "X:HTML/P_O/print" ("print X:HTML"), results in "camera A/P_P/brochure/P_O/print" ("print brochure of camera A"). When a base data in HTML format representing "manual of camera A" is associated with the same camera A too, the description sentence of the metadata corresponding to the latter data can also be associated with the variable X. For example, when the description sentence of the metadata is "camera A/P_P/manual" ("manual of camera A"), associating this with the description sentence, "X:HTML/P_O/print" ("print X:HTML"), results in "camera A/P_P/manual/P_O/print" ("print manual of camera A"). Thus, by using a variable in this way, it is possible to express the fact that a plurality of base data associated with an object are employed as an input to a program. In other words, it can be indicated to the searcher (through a search device) that a plurality of base data associated with an object and a program associated with another object can be combined. (Though the above-described example is a case where a plurality of base data are combined with one program, a single base data can also be combined with a plurality of programs in a similar manner).

Furthermore, a plurality of metadata having different description sentences can be registered with respect to one base data. For example, a metadata having a description sentence, "printer B/P_M/X:HTML/P_O/print" ("print X:HTML with printer B"), and, at the same time, another description sentence, "X:HTML/P_O/printer B/O_M/print" ("print X:HTML with printer B") can be registered with respect to a certain single program for printing.

Figure 7:
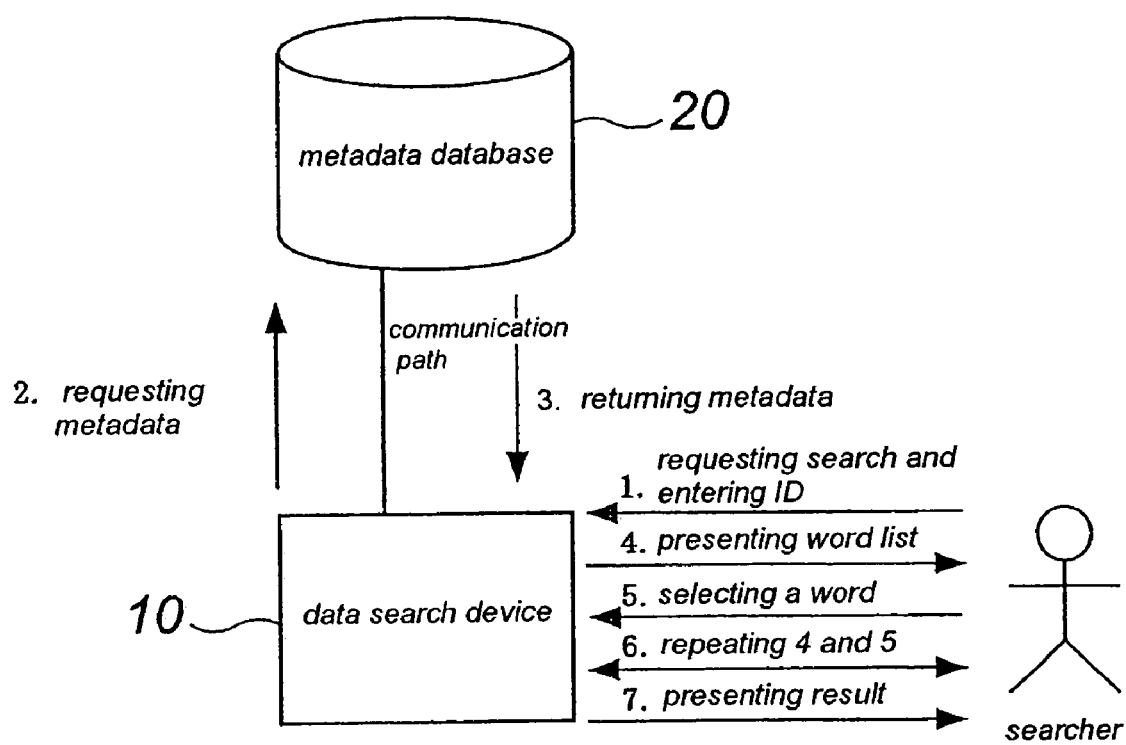
FIG. 7 is a conceptual diagram of a search flow according to one embodiment of the invention.

Referring to the conceptual diagram shown in FIG. 7, which is the flow of a search between the searcher, the data search device and the metadata database, an outline of the flow of a search is described. The searcher reads out the ID of a target object by using a predetermined ID capturing device and captures the ID in advance. (Of course, the ID can be read out as occasion demands.) A plurality of objects can be targeted, and a plurality of objects allow a plurality of IDs to be captured. At the beginning, the searcher sends a search request to the data search device 10. The captured ID is entered into the data search device 10 (1. requesting search and entering ID). In response thereto, the data search device 10 makes a request for a group of metadata (a set of metadata) to the metadata database (2. requesting metadata) and reads out metadata (3. returning metadata). The data search device 10 presents a list of candidate words based on the metadata read out to the searcher (4. presenting word list). The searcher selects and enters a word from the word list (5. selecting a word). Steps "4. presenting word list" and "5. selecting a word" are repeated until the targeted metadata is located. At the end of the search, the search result is presented to the searcher (7. presenting result).

Registration of base data and metadata is described with reference to FIG. 2, which is a conceptual diagram of steps for registering base data and metadata corresponding thereto.

A data provider registers (that is, stores) data in the base data database 20. This is achieved by entering base data to a data entering device, not shown, and registering the base data in the base data database through the communication channel (1. registering base data). An index to the base data is provided by the base data database 30. The data provider obtains the index from the base data database 30 by using the data entering device (2. obtaining index to base data database). By entering the index to the data input device, the searcher can access the base data corresponding to the index. When the database is connected through a communication network such as the Internet, base data can be registered and obtained (uploaded and downloaded) via a terminal such as a personal computer.

The data provider then uses a metadata entering device (the base data entering device may play this role, too), not shown, to register (or, store) metadata including the ID captured from the ID capturing device and the index obtained from the base data database 30 in the metadata database 20 (3. registering metadata including ID and index). The index associates the base data with the metadata corresponding thereto. A description sentence is delimited in a predetermined unit of words and is stored in the metadata database. (A description sentence as shown below is delimited by a word, but may be delimited in an arbitrary unit, if combining a plurality of words instead of breaking down a description sentence to the level of a single word is convenient for a search. For example, a collocation is treated as a single word to reduce the steps required for performing a search for a metadata having a description sentence which contains such a collocation. Thus, all through the specification and the claims, the term "word" refers to both a single word and any sequence of words that is treated as a single unit in the search operation.) For example, if "brochure of camera A" is a target base data (where the data formant of the brochure of the camera A is assumed to be HTML), the metadata corresponding thereto includes an ID assigned to camera A, the data index to the data of "brochure of camera A"), the description sentence, "camera A/P_P/brochure" ("brochure of camera A") (where "/" is a delimiter) and the data type, HTML.

Figure 5:
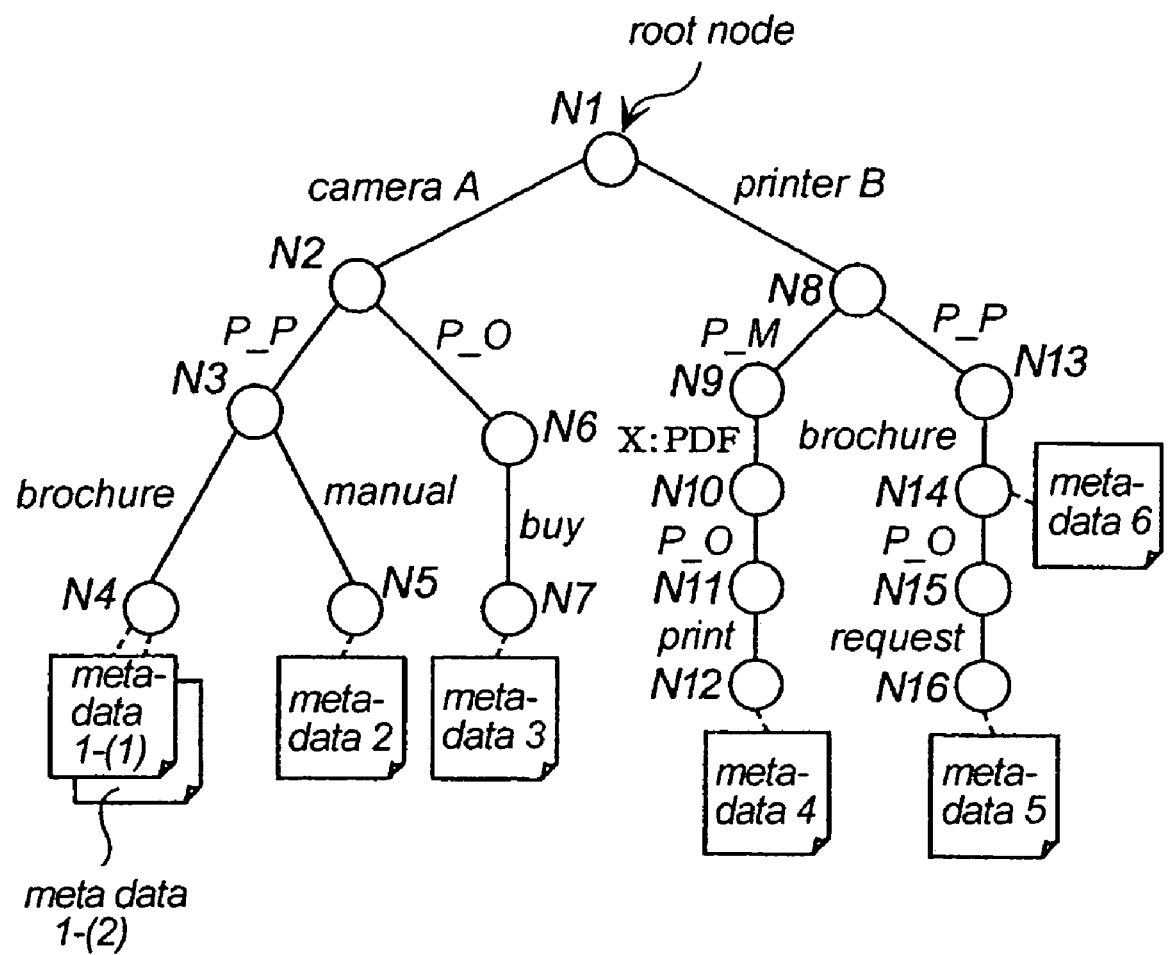
FIG. 5 is a diagram of an exemplary metadata expression tree according to one embodiment of the invention.

A metadata expression tree (hereinafter simply referred to as "tree"), which is a tree structure of metadata, is then described with reference to FIG. 5. According to the present embodiment, a set of registered metadata is expressed in a tree form as illustrated in FIG. 5. In the tree shown in FIG. 5, circles N1 through N16 are nodes, and the lines connecting the nodes are edges. Circle N1 represents a root node, while the remaining nodes (N2 through N16) represent child nodes. Metadata are expressed as a tree structure form because the tree structure enables a search to be performed more efficiently than sequentially referencing the description sentences in metadata and comparing them with a search word. The edge (branch) of the tree has a label which corresponds to each of delimited words in the description sentences. Each description sentence corresponds to a path from the root node of the tree to a certain child node. For example, the description sentence, "camera A/P_P/brochure" ("brochure of camera A") is a path comprising an edge having a label, "camera A", an edge having a label, "P_P", and an edge having a label, "brochure" from the root node (in FIG. 5, the path including edges connecting the nodes N1, N2, N3 and N4.)

A set of metadata, which may be an empty set, is assigned to respective nodes of a tree. Each metadata, which is an element of a set of metadata assigned to a node, has a description sentence that is equal to a sequence of labels along the path from the root node to the node of interest. The root node corresponds to the delimiter at the beginning of the description sentence while the child nodes correspond to the delimiters in the middle and at the end of the description sentence. In other words, representing the above example of the description sentence, "camera A/P_P/brochure" ("brochure of camera A"), so that it corresponds to the nodes results in "/camera A/P_P/brochure/" in which the "/" before "camera A" is the delimiter at the beginning of the sentence, while the "/" immediately after "brochure" is the delimiter at the end of the sentence. The set associated with the child node corresponding to the delimiter at the end of the description sentence (node corresponding to the end of the description sentence) is a set including one or more metadata. Two metadata are assigned to the node N4 in FIG. 5. They are the metadata (metadata 1-(1) and 1-(2)) respectively corresponding to two data representing "detail brochure data of camera A" and "brief brochure data of camera A", for example.

Assume, for example, the labels of the edges of path from the root node to a certain child node are "camera A", "P_P", and "brochure" in that order. Then, the elements of the set assigned to the child node are the metadata having "camera A/P_P/brochure" ("brochure of camera A") as its description sentence. In other words, when metadata having the description sentence represented by the path to a certain node exists, the metadata is assigned to the node; otherwise, no metadata is assigned to the node (that is, an empty set of metadata is assigned thereto).

In FIG. 5, the set having, as its elements, metadata having description sentences, "camera A/P_P/brochure" ("brochure of camera A"), "camera A/P_P/manual" ("manual of camera A"), "camera A/P_O/buy" ("buy camera A"), "printer B/P_M/X:PDF/P_O/print" ("print X:PDF with printer B"), "printer B/P_P/brochure" ("brochure of printer B") and "printer B/P_P/brochure/P_O/request" ("request brochure of printer B") are assigned respectively to the nodes N4, N5, N7, N12, N14 and N16 which correspond to the delimiters at the ends of the sentences. Empty sets are assigned to the remaining nodes.

According to this embodiment, the tree is generated by the data search device 10. Trees may, however, be generated by any means separate from the data search device 10.

The tree generation operation by data search device 10 is described with reference to the flowcharts in FIGS. 11 and 12. The reference numerals in parentheses refer to operation step numbers in the figures.

At the beginning, the data search device 10 obtains a set of metadata from the metadata database 20 (1110). Then, a tree having only a root node is generated (1120). Then, it is determined whether any metadata remains in the obtained set or not (1130). If so, metadata is picked up from the set (1140). Then, a path (where a path is a tree without a branch) is generated from the description sentence of the metadata (1150). Each node of the path corresponds to a word delimiter (including those at the beginning and the end of a sentence). An edge of the path has a word in a description sentence as a label. The set associated with the node corresponding to the end of a sentence is a set having the metadata as its element. Empty sets are assigned to the remaining nodes. Subsequent to step 1150, the generated path is combined with the tree (step 1160).

Details of the operation for combining the path and the tree at step 1160 are described with reference to FIG. 12. At the beginning, the path and the tree are combined so that the root of the path and the root of the tree coincide (step 1210) in which the edges having the same label are consolidated to the same edge. Then, the sets associated with the respective nodes are combined (step 1220). This combination can be performed by, for example, a pseudo code as follows:

TABLE 1

```
"Tree Combining Method"
T: tree corresponding to a set of metadata
P: path represented by metadata (MD₁)
Nodeₚ := root of P
Nodeₜ := root of T
while (Nodeₚ has a child node) {
    foreach (edge eₜ from Nodeₜ to child node)
        if (label of eₜ and label of edge (eₚ) from Nodeₚ to child node are the same)
        then {
            Nodeₚ := child node of Nodeₚ
            Nodeₜ := child node at the end of eₜ
                exit foreach} // end of if
    } // end of foreach
    if (no edges with the same labels)
    then {
        couple eₚ and below to Nodeₜ
        Nodeₜ := end node of coupled path (leaf node)
        exit while} // end of if
} // end of while
add MD₁ to a set assigned to Nodeₜ
```

Figure 11:
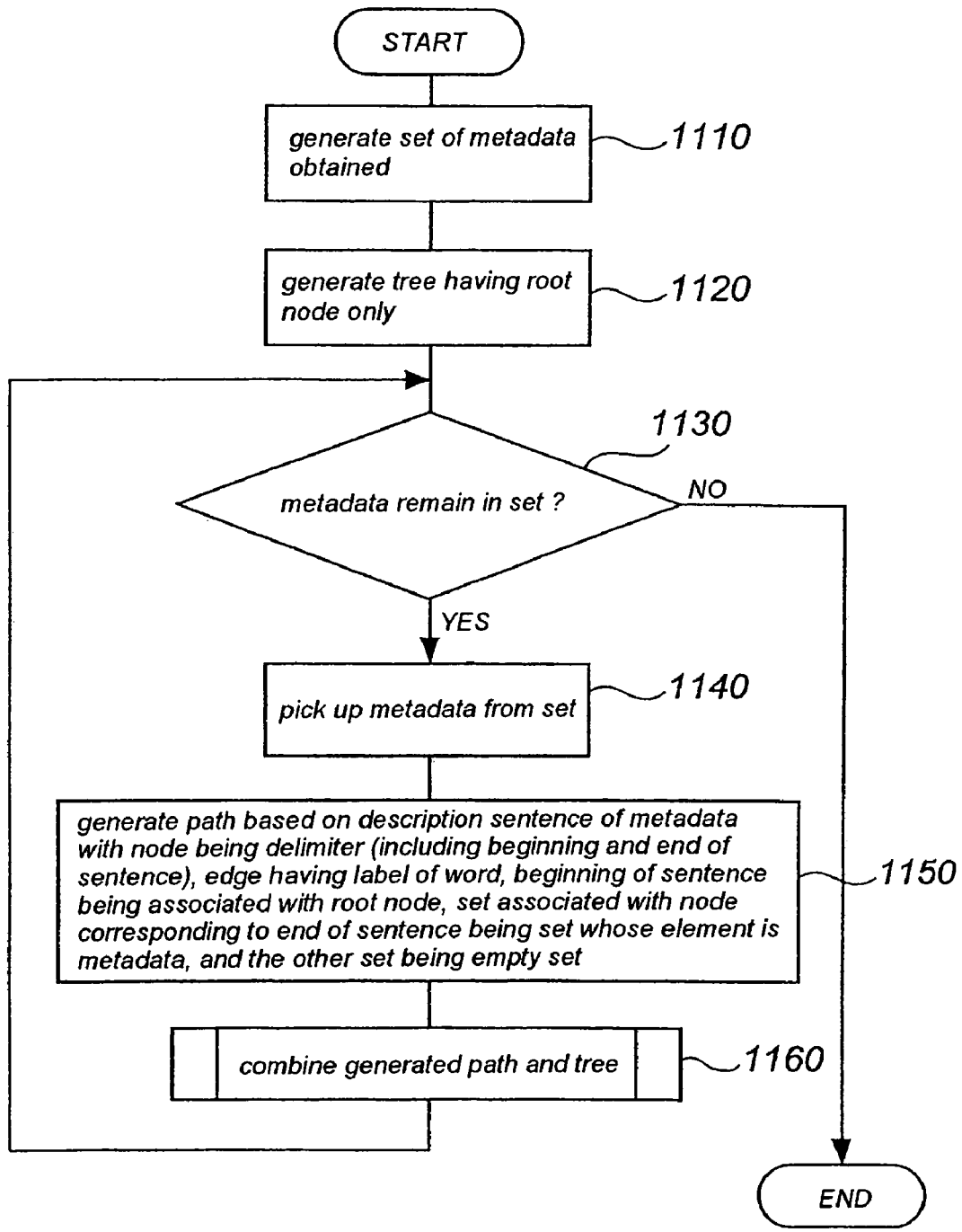
FIG. 11 is a flowchart of "tree generating operation" in FIG. 10 steps.
Figure 12:
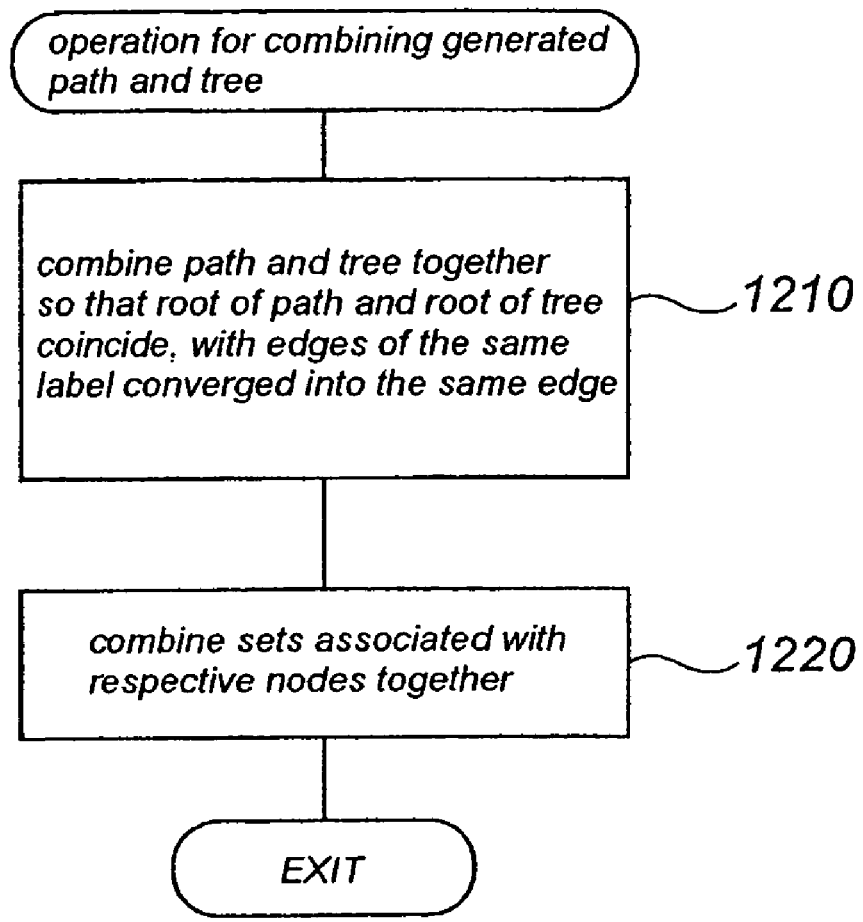
FIG. 12 is a flowchart of "operation for combining generated path and tree" steps.

The control returns to step 1130 in FIG. 11. If any metadata remains in the obtained set, the operation at steps 1140 through 1160 will be repeated. If no metadata remains therein, that is, if all the metadata has been combined in the tree, the operation for tree generation terminates.

Figure 6A:
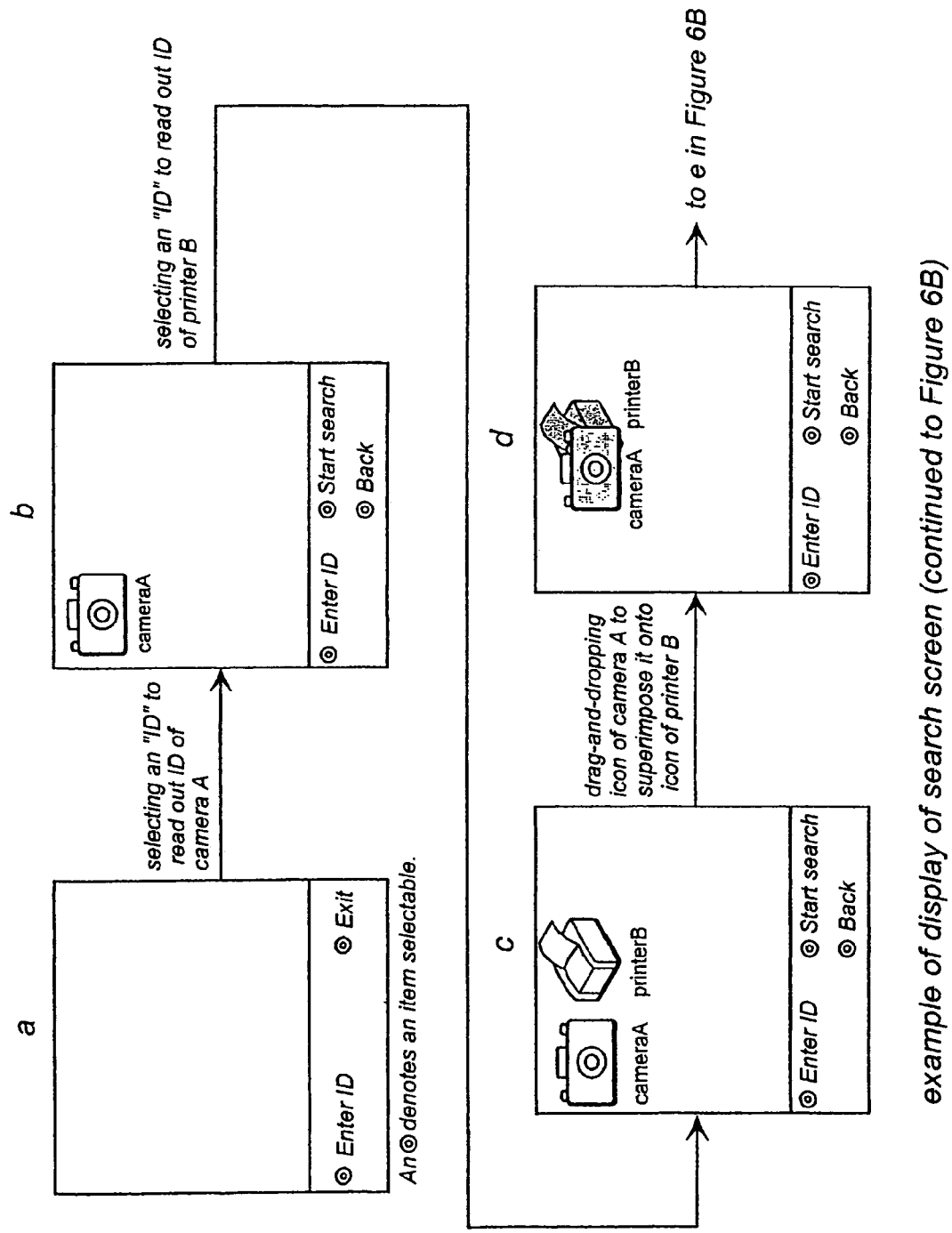
Figure 6C:
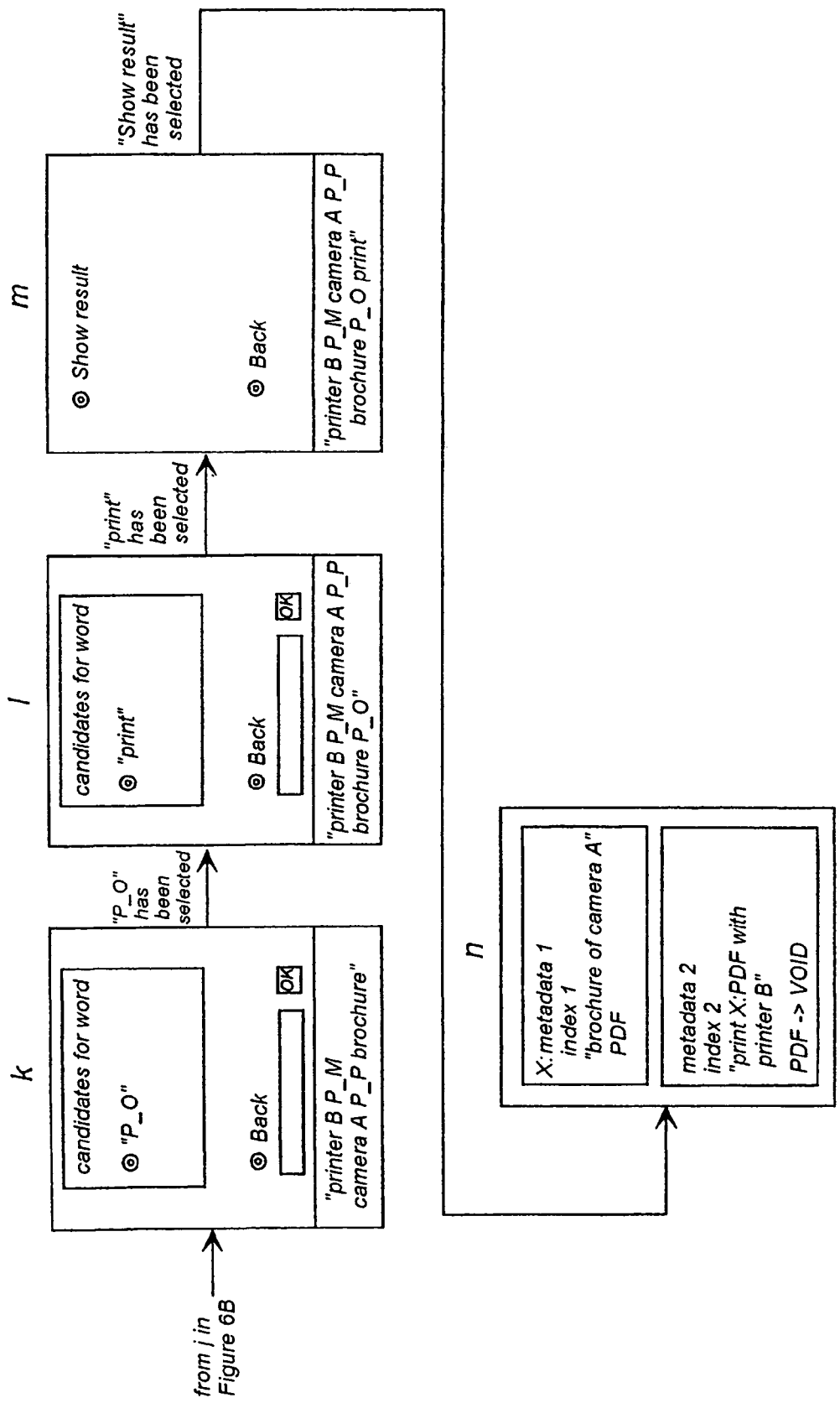

An outline of a data search operation using a metadata expression tree as described above is described with reference to FIG. 3 which shows the configuration of the data search device 10 more specifically. Examples of search screens presented to the searcher by the data search device 10 are shown in FIGS. 6A through 6C.

The data search device 10 according to the embodiment shown in FIG. 3 includes a user interface section (user I/F section) 100 and a search operation section 200. The user I/F section 100 includes an input handler 120, a list display section 140, a search result display section 160 and a search screen 180. The searcher enters a word to be searched to the input handler 120 through the search screen 180. The search operation section 200 includes a list generator 220 and a metadata search section 230. The list generator 220 generates a list of candidates of the subsequent word in response to the ID or word entered by the searcher through the input handler 120. The word list generated by the list generator 220 is sent to the list display section 140, and the word list from the list display section 140 is displayed on the search screen 180.

According to FIG. 3, the metadata search section 230 further includes a metadata reader 236, a tree generator 232, a metadata search engine 234, and a tree storage 238. The metadata reader 236 reads a set of metadata from a metadata database. The tree generator 232 generates a tree from a set of the read metadata. The metadata search engine 234 performs operation for searching metadata by using a tree generated by the tree generator 232 (operation for tracing nodes of a tree, for example). The tree storage 238 temporarily stores a tree and node positions. Preferably, the tree storage 238 has a stack structure. The data search device 10 further includes a control section, not shown, for performing operation for controlling operations of component sections and for managing interfaces among component sections, for example. The data search device 10 further includes a data capturing section 300 for using or capturing corresponding base data from the index included in the metadata located by the metadata searching section 230. The data capturing section 300 includes an index capturing means, not shown, for capturing the index of base data included in the metadata. Presentation of data from the data search device 10 to the searcher is all performed through the display to the search screen 180. A search result is also displayed on the search screen 180 through the search result display section 160.

The data search device 10 can further include an icon generation/operation section, not shown. The icon generation/operation section displays one or more icons corresponding to one or more IDs entered on the search screen 180. A displayed icon can be drag-and-dropped to the other icon. The data search device 10 is configured so that, when an icon is drag-and-dropped to the other icon, the device 10 performs searching by combining metadata respectively associated with IDs corresponding to the icons (metadata combination search).

On entering an ID assigned to a certain object, the data search device 10 configured as above reads a set of metadata including the ID from the metadata database 20 and generates a metadata expression tree from the read set of metadata. When a plurality of IDs are entered, metadata including each of the IDs are read out from the metadata database 20 to generate a metadata expression tree.

The data search device 10 presents the searcher, through the list display section 140, with a menu of candidates of each edge from the root of a generated tree, that is, a menu having a list of words representing the label given to an edge. The searcher can obtain the metadata corresponding to target base data by repeatedly selecting and entering, to the input handler 120, a word from the list. For example, in order to get a brochure of the camera A, which is a specific object, here, the searcher captures the ID of camera A and enters it to the search device 10. The search device 10 reads out all metadata having the ID of camera A from the metadata database 20. Then, a tree structure is generated from the set of metadata. For example, when metadata having the description sentence, "camera A/P_P/brochure", corresponds to the base data of "brochure of camera A", and when searching for the base data of "brochure of camera A" starts, the data search device 10 sequentially presents words, "camera A", "P_P" and "brochure" to the searcher. The searcher obtains the metadata corresponding to the target base data by selecting these words sequentially.

Though the specific means for directly entering or selecting and entering an ID or a search word is not shown, the searcher can directly enter or select and enter it through the search screen 180 by using a conventional input means such as a keyboard, a mouse or a touch panel. Here, a search result to be provided is a set of metadata, and the description sentence of each metadata and at least the index of the base data are displayed. The metadata includes an index of the base data on a base data database. Therefore, based on the index of the specified metadata, the data capturing section 300 obtains the base data specified by the index from the base data database.

When the word to be presented to the searcher is a variable (referred to as X), the list generator 220 adds an item, "Search based on entered ID", to the menu and presents the item through the list display section 140. Thus, the searcher understands that he/she can combine the base data corresponding to the metadata currently searched for with the base data corresponding to another metadata (that is, entering to the program what is performing the current search). When the searcher selects and enters an item, "perform a search based on entered global unique identifier" to the input handler 120, the search operation section 200 interrupts the current search operation and newly starts searching for the metadata associated with the entered ID as a nested search. In case a data combination search was not specified in advance, by performing drag-and-drop superimposition at the beginning of the search, another process can be employed. That is, when only one ID is entered at the beginning of the search, the data search device 10 adds an item, "enter new global unique identifier" to the menu and prompts the searcher for entering a new ID so that the searcher can select this item and enter a new ID. In this case, now that an icon corresponding to the newly entered ID is displayed, a metadata combination search can be specified by performing drag-and-drop and superimposing the original icon onto the newly displayed icon. When another ID has been already entered but it is not superimposed by performing drag-and-drop, the base data combination search is specified by performing drag-and-drop. For clarification, the ID associated with a metadata being searched for is referred to as the first ID, while the ID associated with the other metadata to be combined is referred to as the second ID.

A new search is performed only on the metadata including the first ID or the second ID and including the same data type as the type of the variable X. The metadata including the same data type as the type of the variable X is metadata including the same type as the type of X, as the data type when the data is static data. When the data is a program, the metadata including the same data type as the type of the variable X is metadata including the same output type as the type of X as the data type. In this case, the search operation section 200 reads, from the metadata database 20, a set of metadata having the same ID as the first ID or the second ID and including the same data type as the type of the variable X (that is, corresponding to the data of the same type as the type of the variable X). Then, a tree comprising the set of metadata is newly generated, and the search is performed by using this tree. It should be noted that a plurality of variables can be involved (that is, variables can be assigned to each of a plurality of edges from one node to downstream nodes). In this case, metadata having the same ID as the first ID or the second ID and including the same type as one of the types of the variables is read from the metadata database 20. Then, by following the above-described steps, the tree is generated, and the search is performed. When the search using the newly created tree ends, the temporarily stopped outer search operation, that is, the search using the original tree is restarted.

In this way, by using a variable X, a search can be done in which metadata associated with one or more objects are combined. Furthermore, the type assigned to the variable X avoids the useless operation of trying to combine metadata which cannot be combined. For example, data in PDF format are not passed to an application which supports only display of HTML format, and a printing program for using a printer will not be forced to print image data or the like in a format not supported by the printer.

When a proper word is not included in the list of words provided by the list generator 220 through the list display section 140, the search can be retried by performing a word by word backtrack in which the searcher can return to the previous display state by one word by, for example, clicking the icon, "BACK" (FIG. 6B) on the search screen 180.

The flow of the procedure for a search by using a search system is described more specifically with reference to the flowcharts in FIGS. 8 through 15. The reference numerals in parentheses refer to operation step numbers in the figures. Assume that the searcher specifies a combination search of the metadata associated with two IDs before starting a search operation (step 830 in FIG. 8). Therefore, the item, "enter new global unique identifier" is not displayed at step 1310, but the item, "search based on entered global unique identifier" is displayed. 811 As described above, the search device 10 displays an icon corresponding to the entered ID. When a plurality of IDs are entered, the icons corresponding to the respective IDs can be displayed. When a plurality of IDs are entered and a combination search of metadata associated with these IDs is specified, the search device 10 performs a combination search. As described above, the combination search of these metadata is performed by performing drag-and-drop and superimposing one icon onto any one of the other icons. In this example, the data search device 10 identifies the ID corresponding to the icon of the active side of the drag-and-drop operation as the first ID and the ID corresponding to the passive side of the drag-and-drop operation as the second ID.

Entering a search word is performed by selecting and entering a word from a list of the words generated by the list generator 220 and displayed on the search screen 180 by the list display section 140.

Figure 8:
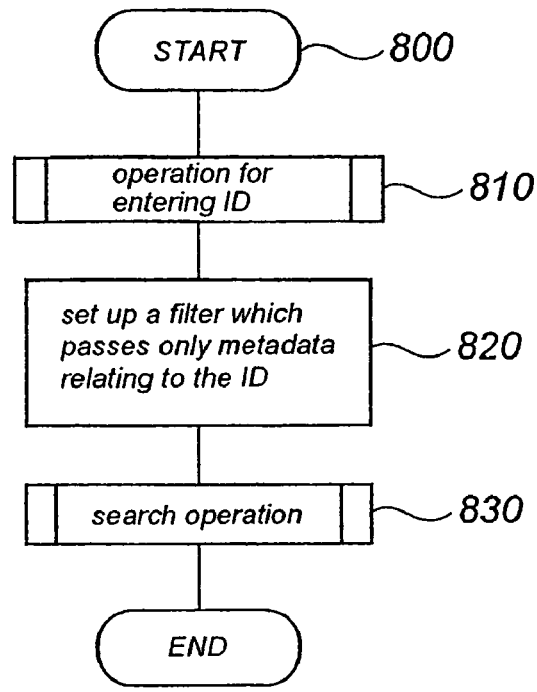
FIG. 8 is the uppermost level flowchart of steps of a search system according to one embodiment of the invention.
Figure 9:
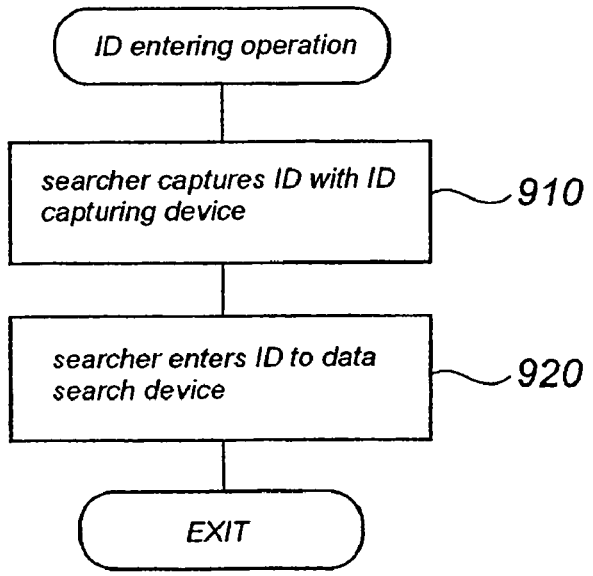
FIG. 9 is a flowchart of "global unique identifier input operation" steps.

At the beginning, the searcher enters an ID of a targeted object to the data search device 10 at step 810 (operation for entering ID) in FIG. 8. Entry of the ID is performed by the searcher entering into the search device 10 (920) the ID obtained with the ID capturing device 40 (910), as shown in FIG. 9. In this case, when there are a plurality of search target objects, a plurality of IDs to be entered can exist.

After the step of entering a global unique identifier, the search operation section 200 (specifically, the metadata reader 236 in accordance with an instruction from a control section, not shown) sets a filter for capturing metadata from the metadata database at step 820 in FIG. 8. The filter according to this embodiment has three settings including first filter setting for passing only the metadata including a specific ID, a second filter setting for passing only the metadata including a specific ID and a specific data type where, when the data is static data, the data type is a data format, and, when the data is a program, the data type is an output type, and a third filter setting for passing only the metadata, the word at the beginning of the description sentence being a variable and the type of the variable having a specific data type. At step 820, the first filter setting is employed in order to pass only the metadata including the first ID or the second ID. Next, the data search device 10 starts a search process shown at step 830 in FIG. 8.

Figure 10:
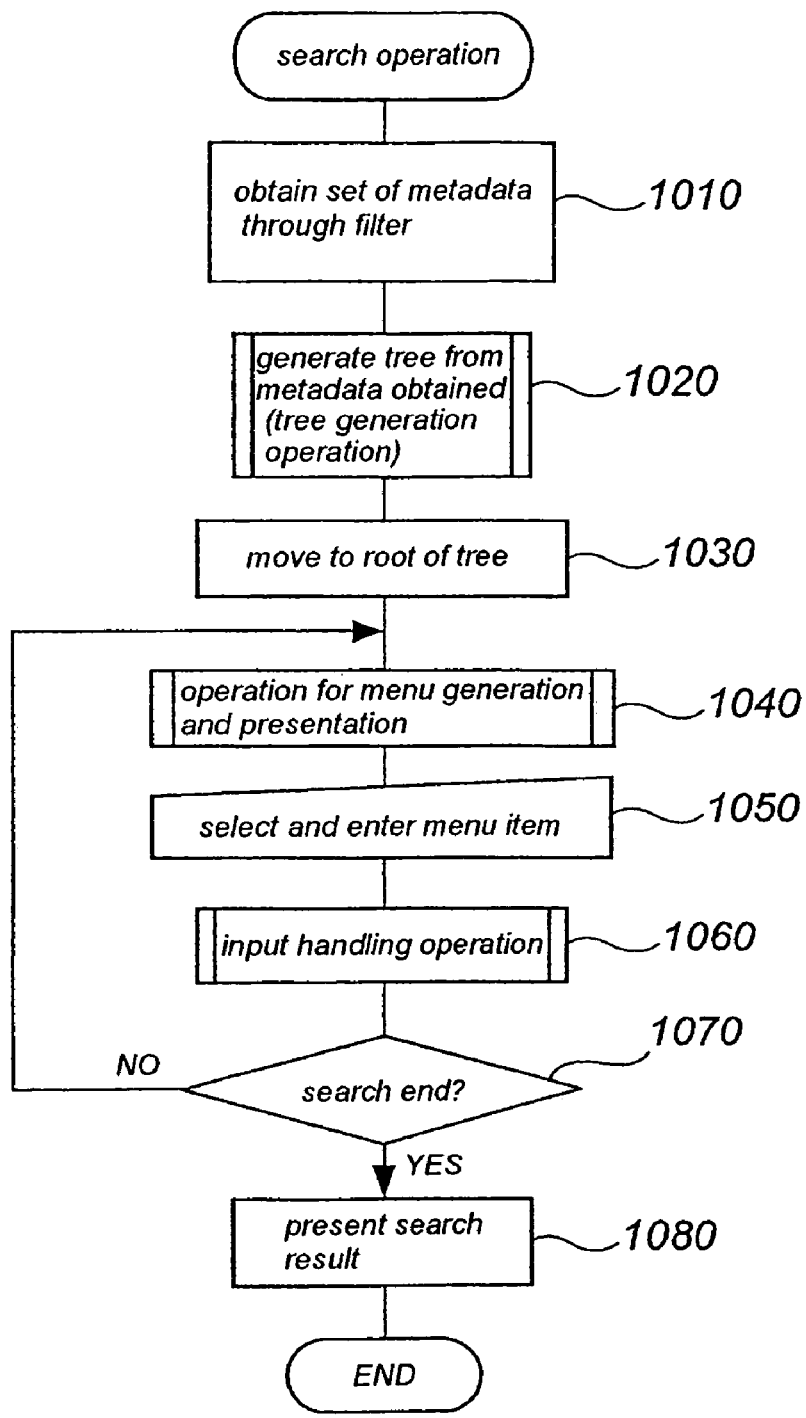
FIG. 10 is a flowchart of "search operation" in FIG. 8 steps.

Steps for the search process are shown in detail with reference to the flowchart in FIG. 10.

The metadata reader 236 of the search operation section 200 captures only the metadata passing through the filter properly set in one of the settings (1010).

The tree generator 232 then generates a tree from a set of obtained metadata (1020). The search operation section 200 moves to the root node of the generated tree (1030). The list generator 220 generates a menu composed of a list of the labels which are given to the edges directed to immediately downstream child nodes, that is, words at the beginning of each description sentence and presents the menu to the searcher through the list display section 140 (1040). The searcher selects and enters a desired word (item) from the presented list to the input handler 120 (1050). The process for menu generation and displaying at step 1040 is described later in detail with reference to FIG. 13.

During the input handling step 1060 in FIG. 10, the data search device 10 performs, in response to a word entered by the searcher, processes, such as displaying a search result and presenting to the searcher the menu comprising list of the candidate words to follow the entered word. The input handling is described in more detail with reference to FIG. 14.

At step 1070, on recognizing the end of search, the search operation section 200 displays the search result on the search screen 180 (1080). If the search has not ended yet, the operation returns to step 1040 and continues. 90 Next, the process for menu generation and displaying by the data search device 10 are described with reference to FIG. 13. At the beginning, the list generator 220 generates a menu having items, which are labels of the edges from a current node to a downstream child node. When the label is a variable, an item, "search based on entered global unique identifier", is added to the menu and is displayed on the search screen 180 through the list display section 140 (1310).

Next, the metadata search engine 234 that performs search operation section 200 determines whether or not any metadata is assigned to the current node (1320). If any metadata is assigned to the current node, the list generator 220 adds, to the menu, items, "Show result" and "Continue search with result used", (1330). The list display section 140 presents the menu to the searcher (1340). If no metadata are assigned to the current node, the operation in the search operation section 10 skips step 1330 and goes to step 1340. The search operation section 10 presents the menu generated at step 1340. After performing step 1310, the "process for menu generation and displaying" exits.

Figure 14:
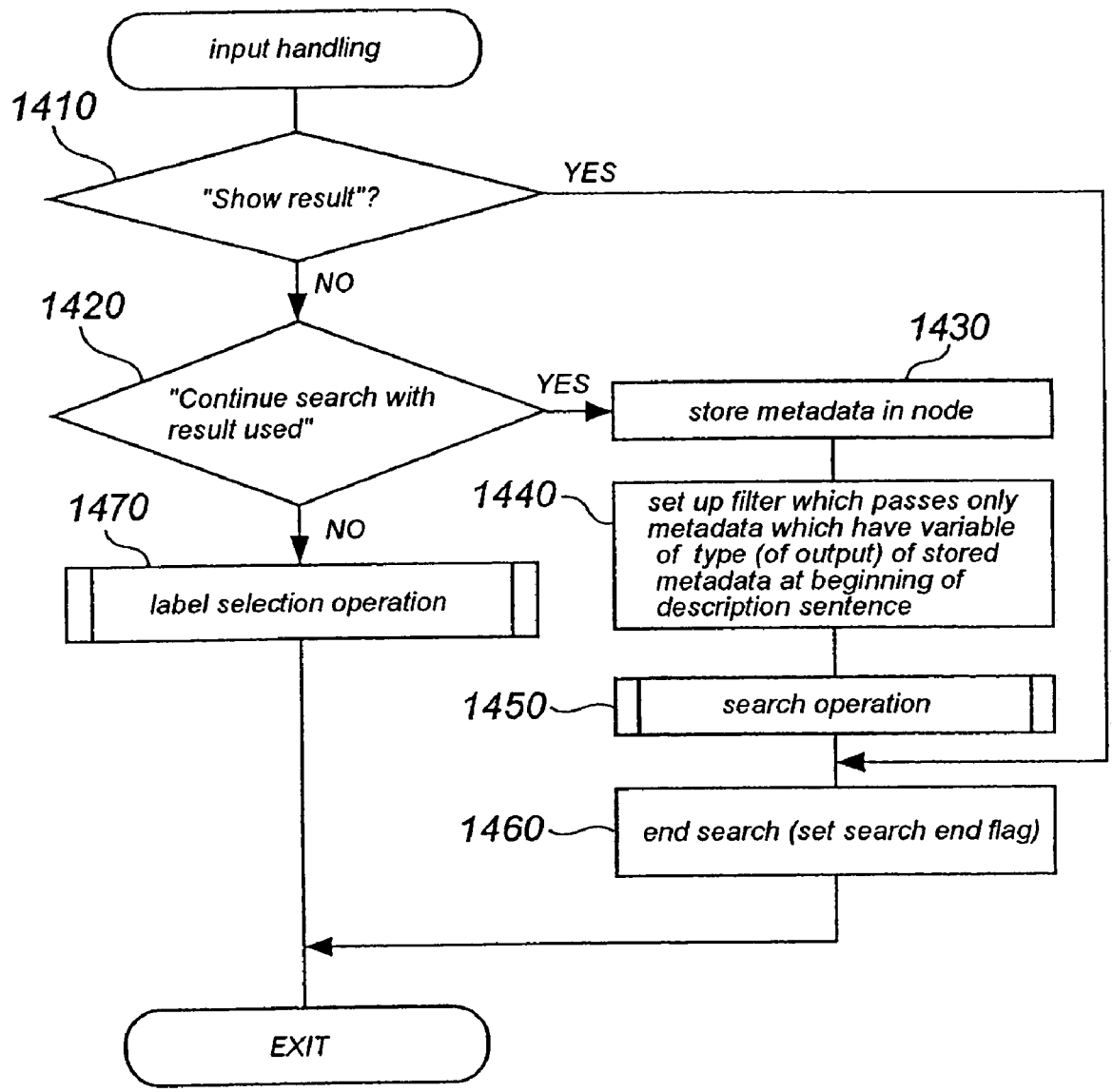
FIG. 14 is a flowchart of steps of "input operation".

Next, input handling by the data search device 10 is described with reference to FIG. 14.

Figure 13:
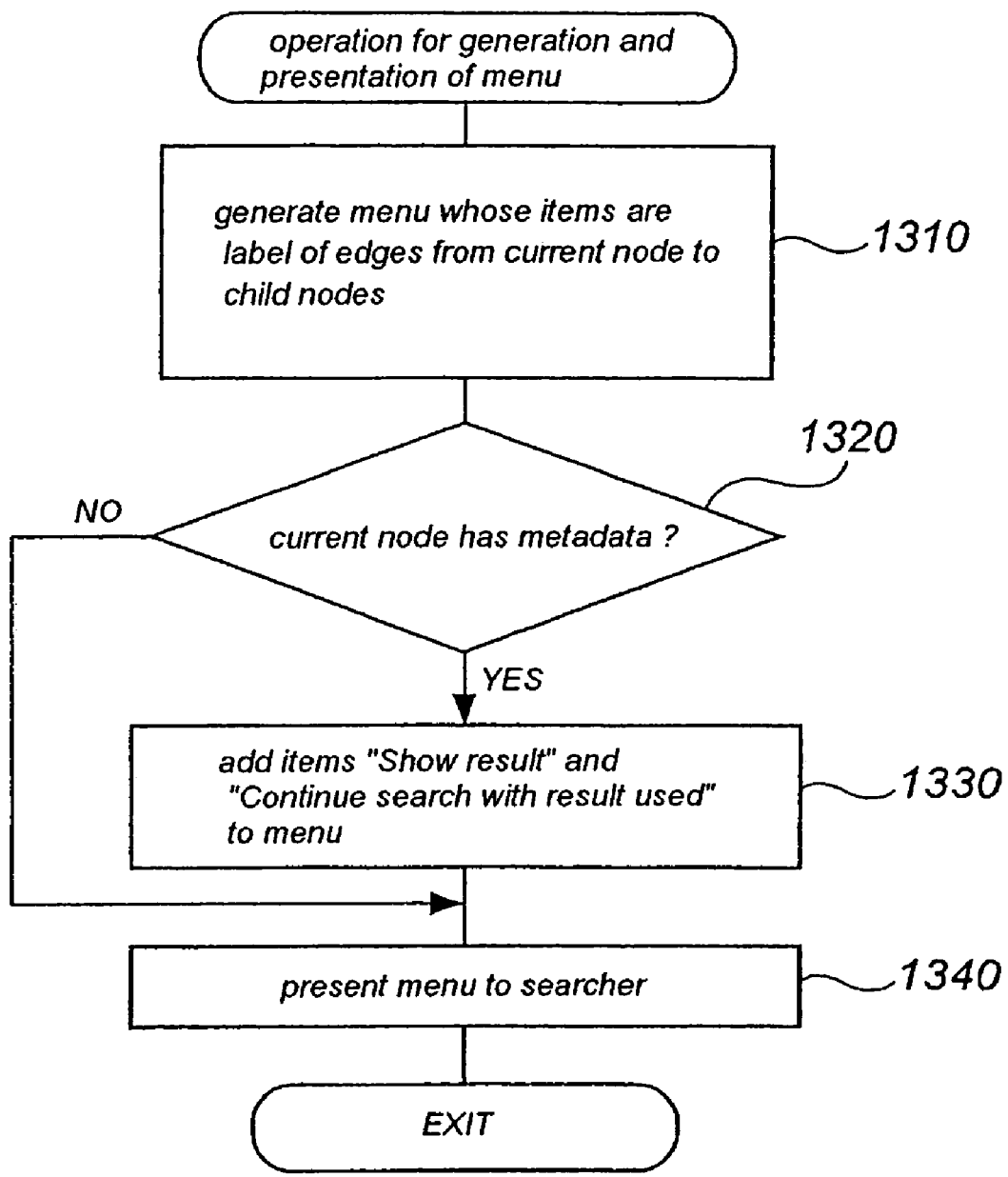
FIG. 13 is a flowchart of "menu creation and provision operation" steps.

The search operation section 200 determines whether the item (word) selected and entered by the searcher to the input handler 120 by selecting and entering a menu item at step 1050 in FIG. 10 is "Show result" or "Continue search with result used" generated by the list generator 22 at step 1330 in FIG. 13 (1410 and 1420). If the "Show result" is entered, the search result is displayed on the search screen 180. Then, the search ends (more specifically, a search end flag is set) (1460), and the input handling exits. If a node to which metadata is assigned is captured at step 1460, the inquiry of whether the search is continued or not is presented to the searcher. If the searcher instructs "end the search", the search ends. If the searcher instructs "continue the search", searching for metadata having a description sentence including, as the prefix, a description sentence of metadata assigned to the node (operation for tracking down the nodes downstream from the node N14 in FIG. 5 and/or a newly started search by using the result of the current search starting from block 1440 in FIG. 14 which will be described below) is performed.

If the item entered by the searcher is "Continue search with result used", the search operation section 200 stores metadata assigned to the current node in a storage (memory), not shown (1430). The metadata reader 236 sets the filter for passing only those metadata having, at the beginning of the description sentence, a variable of the same type as the data type (the type of the value for static data while the return value, that is, the type of the output for a program) included in the stored metadata (that is, the third filter setting) (1440). Thus, the metadata reader 236 captures only the metadata passing through the filter. The search process shown in FIG. 10 is performed on the captured metadata (1450), the search end flag is set (1460), and the input handling exits.

If the item entered by the searcher is neither "display result" nor "continue search by using result", the search operation section 200 performs the label selection operation (1470), which is described below. Thereafter, input handling exits.

Figure 15:
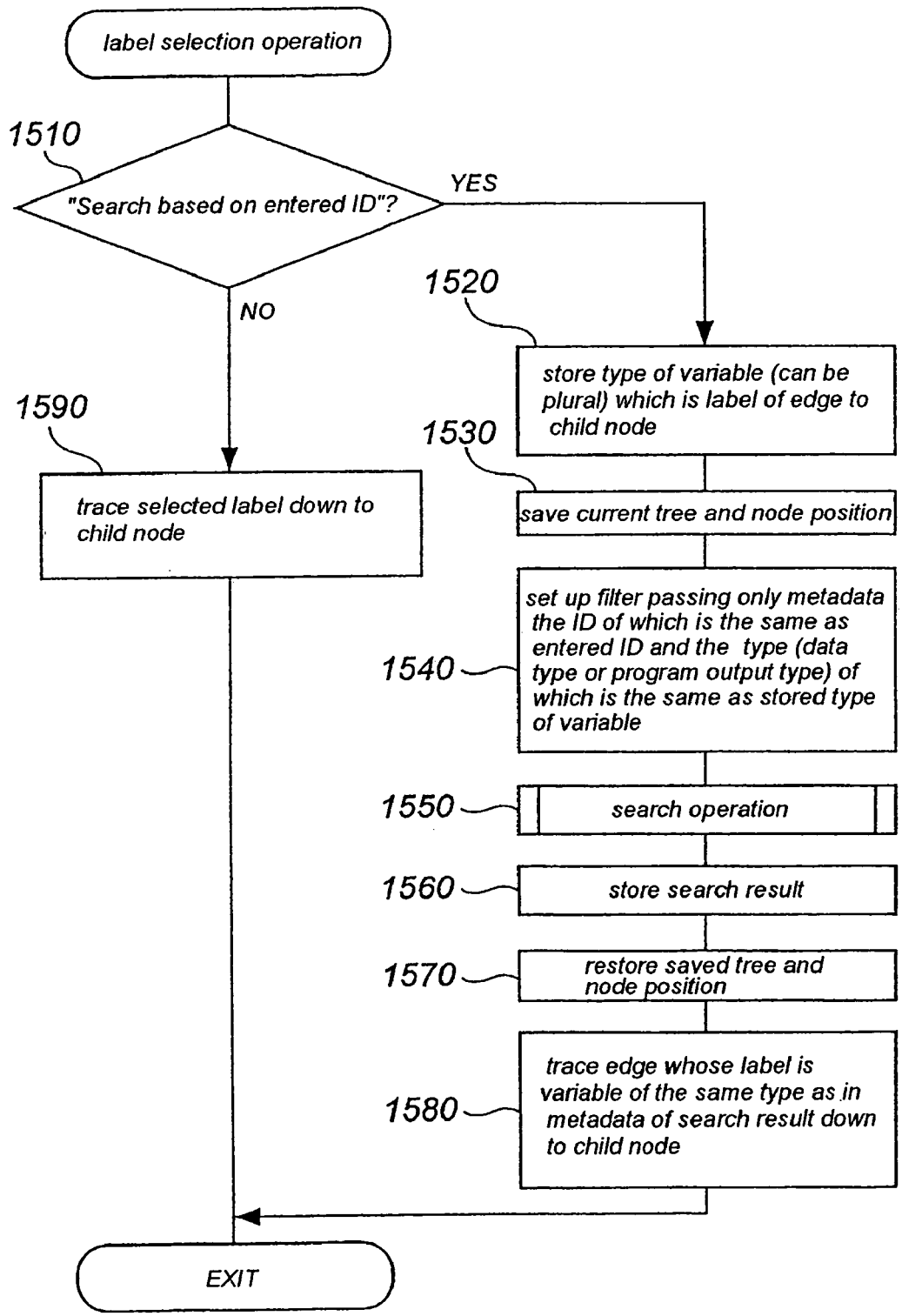
FIG. 15 is a flowchart of steps of the "label selecting operation" in FIG. 14.

The operation of label selection is described with reference to the flowchart in FIG. 15. At the beginning, the search operation section 200 determines whether or not the item, "search based on entered global unique identifier" is selected by the searcher (1510). If not, the edge corresponding to the other selected items is traced down to a child node (1590). Thereafter, the operation of label selection exits.

If the item, "search based on entered global unique identifier", is selected, the search operation section 200 stores, in a storage (memory), not shown, the type (or types) of the variables which are labeled on the edges to the child nodes (1520). The current tree and the position of the current node are saved in the tree storage 238 (1530) and a new nested search is started.

In other words, the metadata reader 236 of the search operation section 200 sets up the filter for passing only the metadata including the same data type as the types of variables stored at step 1520 and including the first ID or the second ID (that is, performs the second filter setting as described above) (1540) to capture only the metadata passing through the filter. The search process shown in FIG. 10, that is, the new nested search is performed on the captured metadata (1550). The search operation section 200 stores the search result (metadata) captured in the search process in the storage (memory), not shown (1560). By restoring the tree and the position of the node saved at step 1530 from the tree storage 238, the operation returns to the outer search (1570). The return process returns the operation to the node position of the tree before the saving. Then, by tracing down the edge of the label, which is the variable, from the returned tree node, the operation moves to the child node (1580). In other words, the operation moves to the child node by tracing down the edge having the same type as the data type included in metadata indicated in the search result stored at step 1560. The description sentence of the metadata located at step 1550 is associated with the above described variable. After performing step 1580, the label selection operation exits. If no metadata is located as a result of the search process (1550), the search device 10 displays the message to this effect and the label selection operation exits after skipping step 1560 and performing step 1570.

Next, specific steps for registering base data and metadata in the database are described.

In the example below, base data is stored in the database on the Internet. The metadata corresponding thereto are stored in another database on the Internet. However, the base data and the metadata corresponding thereto are stored in the same database.

URL1, URL2, URL3, URL4 and URL5 are data indexes representing four different specific URLs (Uniform Resource Locators). PDF, DOC, HTML and VOID are data types. PDF stands for Portable Document Format and is the file format used by Adobe Acrobat (registered trademark). DOC is a file format used by Microsoft Word (registered trademark). HTML stands for Hyper Text Markup Language and is a language format for writing Web pages. VOID is a type of an input or return value (output) of a program. When inputs are of the VOID type, the program does not have inputs. When outputs are of the VOID type, the program does not have return values (outputs).

In order for the ID capturing device 40 to read an ID, the ID must be registered with the ID capturing device 40 in advance. In the example below, the specific IDs of "camera A" and "printer B" (cameraA and printerB, respectively) are registered with the ID capturing device 40. Alternatively, a code read from a given object is sent to a conversion server, not shown, on a network to convert it to the ID.

Steps 1) through 11), described below, are performed by a data provider and performed by operating a predetermined data input terminal, for example.

1) A brochure (data in PDF format) of the camera A is placed at URL1.
2) Metadata including the ID of the camera A, URL1, "camera A/P_P/brochure" ("brochure of camera A"), and PDF format are stored in the metadata database.
3) A manual (data in DOC format) of the camera A is placed at URL2.
4) Metadata including the ID of the camera A, URL2, "camera A/P_P/manual" ("manual of camera A"), and DOC format are stored in the metadata database.
5) An online shop (program) of the camera A is placed at URL3.
6) Metadata including the ID of the camera A, URL3, "camera A/P_P/camera A" ("dealer of camera A"), and HTML format are stored in the metadata database.
7) A program for printing with printer B is placed at URL4.
8) Metadata including the ID of the printer B, URL4, "printer B/P_M/X:PDF/P_O/print " ("print X:PDF with printer B"), input:PDF and output:VOID are stored in the metadata database. Here, "input:PDF and output:VOID" means that base data corresponding to the metadata is a program having data in PDF file format as inputs and having no return values (that is, values are not returned).
9) Metadata including the ID of the printer B, URL4, "X:PDF/P_O/print" ("print X:PDF"), input: PDF and output: VOID are stored in the metadata database.
10) A manual (data in PDF format) of the printer B is placed at URL5.
11) Metadata including the ID of the printer B, URL5, "printer B/P_P/manual" ("manual/of/printer B") and PDF format are stored in the metadata database.

Through these steps, the static data, "brochure of camera A", "manual of camera A", "online shop of camera A" and "manual of printer B" are stored in the areas specified by URL1, URL2, URL3 and URL5 of the base data database 30. The program for "print with printer B" is stored in the area specified by URL4 of the base data database 30. The metadata corresponding thereto are stored in predetermined areas in the metadata database 20. In this example, metadata including two description sentences, "printer B/P_M/X: PDF/P_O/print" ("print X:PDF with printer B") and "X:PDF/P_O/print" ("print X:PDF"), are stored with respect to the base data, "program for printing with printer B".

The specific steps for searching for a program for "print brochure of camera A with printer B" when base data and metadata are registered as described above are described next. In following steps, once two IDs are input, the data search device 10 displays two icons corresponding to the IDs on a search screen. The searcher instructs the search device 10 to perform a search with the metadata associated with the two IDs combined by performing drag-and-drop and superimposing on one displayed icon onto the other.

An outline of screen information displayed on the search screen 180 to the searcher in the steps is shown in FIGS. 6A through 6C. FIGS. 6A through 6C exemplify the screen displays until metadata corresponding to the description sentence of the program is located and is displayed. An input box for a search word is a box for entering a search word by the searcher and is optional and can be provided as required.

1) The searcher captures the ID (cameraA) of the camera A from the ID capturing device and inputs the ID to the data search device 10.
2) The data search device 10 displays the icon representing the camera A on the search screen 180 (b in FIG. 6A).
3) The searcher captures the ID (printerB) of the printer B from the ID capturing device 40 and inputs the ID to the data search device 10.
4) The data search device 10 displays the icon representing the printer B on the search screen 180 (c in FIG. 6A).
5) The searcher superimposes (drag-and-drops) the icon of the camera A on the icon of the printer B by using a pointing device (d of FIG. 6A). Thus, the data search device 10 recognizes that a search should be performed in which metadata associated with the ID (cameraA) of the camera A and the ID (printerB) of the printer B respectively are combined.
6) The searcher instructs the data search device 10 to start the search by clicking a search start button on the search screen 180, and the search is started.
7) The data search device 10 obtains all the metadata including (cameraA) and printer B as IDs from the metadata database 20.
8) The data search device 10 generates the above-described tree from the description sentence of the obtained metadata.
9) The data search device 10 moves to the root node of the tree, generates a list of the labels of the edges extending from the root node, and presents the list to the searcher as a menu (e in FIG. 6B).
10) The searcher selects "printer B" from the presented menu.
11) The data search device 10 traces edges having the label, "printer B", and reaches to the next child node.
12) The data search device 10 examines the edges from the current child node reached at step 11) to the next child nodes and generates a list comprising the words which are the labels of these edges. In this example, it is a list comprising word items, "P_P" and "P_M" (f in FIG. 6B.)
13) The data search device 10 presents the generated list as the menu to the searcher (f in FIG. 6B).
14) The searcher selects "P_M" from the menu presented.
15) The data search device 10 traces the label of "P_M" and moves to the child node.
16) The data search device 10 examines the edges from the current child node reached at step 15) to the next child nodes and generates a list comprising the words which are the labels of these edges. In this example, however, since the word next to "P_M" which can be the candidate is the variable X, the item of the list is "search based on global unique identifier entered".

17) The data search device 10 presents the menu of the generated list to the searcher (g in FIG. 6B).

18) The searcher selects "perform a search based on global unique identifier entered" from the presented menu.

19) The data search device 10 saves the tree and the position of the current node and interrupts the current search. Then, the data search device 10 starts a nested new search.

20) Since the type of variable X is PDF, the data search device 10 obtains, from the metadata database, metadata whose static data type or program output type is PDF and which includes the ID, "cameraA" or "printerB". Then, the data search device 10 generates a new tree.

21) The data search device 10 examines the edges extending from the root of the tree generated at step 20), and a list of words which are the labels of the edges is generated. In this example, the list comprises the words, "camera A" and "printer B", since the description sentence words in the metadata which includes the data type, PDF, and includes the ID, "cameraA" or "printerB", are "camera A" and "printer B". (Alternatively, since "printer B" has already been selected during the search in the outer nest, a list comprising the only remaining choice, "camera A", is generated. Alternatively, since "camera A" is the only choice, the operation moves to the next step by assuming that the searcher has selected "camera A.")

22) The data search device 10 presents the generated list as the menu to the searcher (h in FIG. 6B).

23) The searcher selects "cameraA" from the menu.

24) The data search device 10 tracks down the edge labeled as "camera A" to the child node.

25) The data search device 10 examines the edges from the current node to its child nodes and generates the list which comprises the label words of the child nodes. Then, the data search device 10 presents the list to the searcher (i and j in FIG. 6B).

26) The searcher selects "P_P" and then "brochure" (i and j in FIG. 6B).

27) The data search device 10 detects the end of the description sentence of metadata and stores this metadata together with the information that the data type is the same as the type of X.

28) The data search device 10 has completed the nested search and returns to the outer search by restoring the saved tree and current node.

29) The data search device 10 tracks from the returned current node down the edge having the variable X to the child node. At this child node, the data search device 10 examines the edges of its child node, generates a list of words which are the labels of these child nodes and presents the list as the menu to the searcher. In this example, "P_O_is generated as the item of the word list and then a list comprising "print" is generated (k and 1 in FIG. 6C). The operation then goes to the next step, 30). If the current node is not the node corresponding to the end of the description sentence which is now being traced, the above-described operation is repeated so subsequent child nodes are examined to generate a word list and present it as a menu until the node corresponding to the end of the sentence is reached. This also applies to step 32).

30) The searcher selects "W_O" and then "print".

31) The data search device 10 traces down the edge having the label, "print", to the child node.

32) The data search device 10 detects that a metadata is assigned to the child node reached at step 31). Then, the data search device 10 generates a list comprising the item, "display result" and presents the list as a menu to the searcher (m in FIG. 6C).

33) The searcher selects "display result".

34) The data search device 10 presents the metadata assigned to the node to the searcher. The data search device 10 indicates that the metadata stored at step 27) corresponds to X (that is, the type of the data corresponding to the metadata is the same as the type of X) (n in FIG. 6C).

If a plurality of variables are included in the located metadata, the correspondence between each variable and the metadata is also displayed. For example, when the description sentence of the metadata resulting from the search is "printer B/P_M/X:PDF/and/Y:PDF/P_O/print" ("print X:PDF and Y:PDF with printer B") and description sentences, "camera A/P_P/manual" ("manual of camera A)" and "camera A/P_P/specification" (specification of camera A) are associated respectively to the variables X and Y, a display indicates that the metadata which respectively have description sentences, "camera A/P_P/brochure" ("brochure of camera A") and "camera A/P_P/specification" ("specification of camera A") that correspond respectively to variables X and Y, in addition to the metadata, "printer B/P_M/X:PDF/and/Y:PDF/P_O/print".

While the operations by the data search device 10 according to one embodiment have been described, the data search device 10 can also be constructed to operate in the manner described below.

On presenting a list of words to the searcher, the data search device 10 can appropriately change the order of the words. Specific methods include the data search device 10 maintaining search history such as entered words and their frequencies so that device 10 arranges the entered words in an increasing order of frequency from the top of the menu. In this way, the search efficiency by the searcher can be improved.

The data search device 10 can record the synonymy of words in its internal dictionary and add to the list to be presented to the searcher words having the same meaning. For example, since "print" and "run off" are synonymous, these two expressions can be included in the list so that, whether the searcher selects "print" or "run off", the searcher can locate the same program. Therefore, a target program can be found more easily and quickly.

The data search device 10 has a function for registering an inclusion relationship of word meanings and adding words having an inclusion relationship to the list of words to be presented to the searcher. For example, "camera A (specific model name of a certain camera) is included in camera (common noun)" is written in advance in a dictionary within the data search device 10. In this case, when "camera A" exists in a word list, "camera" is also added in the list of words to be presented. In addition, if the searcher first enters the word "camera", metadata having "camera A" at the beginning of the description sentences are obtained from the metadata database.

The input handler included in the user I/F section of the search device 10 is configured so that the searcher can directly enter a word instead of the searcher selecting a word from a menu, or alternatively, is configured so that the entering can be done by selecting between the menu and direct input. When the input handler is configured as in the latter manner, the search device 10 is configured to instruct the input handler so that the searcher can directly enter a word in case many words are to be presented to the searcher.

The direct input can be performed, for example, by entering a search word in the search word input box shown in FIG. 6B and clicking on "OK".

The search device 10 has a function for adding to a description sentence additional information that the word order can be changed. For example, it is possible to add the additional information that "X:HTML/P_O" ("X:HTML") and "printer B/P_M" ("with printer B") can be rearranged (exchanged) to the description sentence, "X:HTML/P_O/printer B/P_M/print" ("print X:HTML with printer B"). With this arrangement, the data provider does not have to further register the metadata having the description sentence, "printer B/P_M/X:HTML/P_O/print" ("print X:HTML with printer B").

Though the above-described embodiment is configured so that a metadata expression tree is generated by the tree generator 232 in the data search device 10, the configuration can be employed in which the metadata database generates a metadata expression tree on the metadata database in advance.

Though the above-described embodiment is configured so that the ID read from the ID capturing device 40 is directly entered into the search device 10 and appears as an icon on the screen, the searcher may be entering it to the search device 10 by, for example, the searcher's manual entry of the read out ID.

The functions of the data search device 10 can be performed in hardware or software or in combination thereof. When the functions of a data search device according to the present invention are implemented by software executable on an operating system such as Microsoft Windows (registered trademark) which supports GUI, an indication of the search screen, such as the icon for an object, can be displayed on the monitor screen of a computer.

In the above-described embodiment, an ID is included in metadata, and an object and the metadata are associated through the ID. Metadata, however, does not have to include the ID itself, but can include another identifier which uniquely identifies the ID so that the metadata and the object can be associated through this identifier.

In the specific example of the search procedure, an example is of a search in which metadata associated with different objects are combined for searching. It is apparent from the above-described configuration, however, that a search can be done by combining different data associated with the same object. Another method for specifying a combination search is, for example, displaying two of the same icons by entering two same IDs at the IP entering stage at the beginning of a search, and superimposing these icons by performing drag-and-drop on them. This is pertinent, for example, to the case in which a program for performing an operation, "print brochure of printer B with printer B", should be searched for when printer B is associated through its ID with both of the metadata (corresponding to a program) including a description sentence, "printer B/P_M/X:PDF/P_O/print" ("print X:PDF with printer B"), and the metadata (corresponding to static data) including the description sentence, "printer B/P_P/brochure" ("brochure of printer B"), and the data type: PDF.

In the description above, the ID associated with the drag-and-dropped icon (that is, the moved icon) and the ID associated with the icon on which the drag-and-dropped icon is superimposed (that is, the icon not moved in the drag-and-drop process) are handled without any distinction. The moved and fixed icons can, however, be handled differentially. For example, the moved icon can be associated with the static data to be processed, the fixed side icon associated with the program for processing the static data to be processed.

Furthermore, though the description of the above described embodiment assumes that the description sentences are written in the word order of a specific language, i.e., Japanese, the present invention of course applies to description sentences of any different word order. For example, the tree can be constructed in substantially the same manner as the above described embodiment for a description sentence in a language, such as English and Chinese, in which a verb is placed before its object to perform a search by using that tree. In this case, since a verb is placed at the root instead of a noun, the first selection is made on what operation is done, rather than first selecting the object which is the target of an operation. Thus, even when the word order of the description sentences are different from that of the above described embodiment, it is possible to obtain the description sentences from the set of metadata, generate a tree to search from these description sentences, and generate a menu from it to present to the searcher in the same manner as the above described embodiment. The nested search can be performed in the same manner, too.

According to the present invention, data and/or programs associated with a certain "object" can be searched for efficiently. Furthermore, when one or more data and/or programs are associated with each of one or more objects, a search in which the data and programs are combined can easily be done.

The invention claimed is:

1. A method of searching for data comprising a plurality of metadata, wherein each metadata includes at least a global unique identifier, a data index and a description sentence of base data, said global unique identifier being an identifier for identifying a specific object, each of said metadata being associated with corresponding base data by said data index and being associated with said specific object by said global unique identifier, each of the plurality of metadata being capable of including the same global unique identifier, the method comprising the steps of:

entering said global unique identifier; capturing a set of metadata including said entered global unique identifier; and searching for a first specific metadata based on a description sentence included in each metadata in said captured set of metadata;

wherein said description sentence of said metadata in said captured set of metadata is a sequence of words, the method further comprising the steps of:

(a) holding said captured set of metadata and obtaining and presenting words at the beginning of description sentences included in said set of captured metadata;

(b) selecting and entering one word from said presented words;

(c) holding only said captured metadata having a description sentence including a word matching said entered word among said held captured metadata;

(d) obtaining and presenting a word from the description sentence of said held metadata, said obtained and presented word being at the position in the sequence next to said matching word;

(e) repeating said steps (b) through (d) until the word obtained at said step (d) is the last word of any description sentence of the held metadata; and (f) presenting a metadata among the held metadata and the description sentence of which has the last word at said step (e) as the last word.

2. The data search method according to claim 1, further comprising, after said step (f), the steps of:
(g) selecting said presented metadata to be said first specific metadata and further performing said steps d, e, and f; and
(h) repeating said step (g) until said presented metadata is determined as said first specific metadata.

3. A data search method comprising a plurality of metadata, wherein each of metadata includes at least a global unique identifier, a data index and a description sentence of a base data, said global unique identifier being an identifier for identifying a specific object, each of said metadata being associated with corresponding base data by said data index and being associated with said specific object by said global unique identifier, said metadata further including a type of said associated base data, each of the plurality of metadata being capable of including the same global unique identifier, said description sentence being a sequence of words, a word of said description sentence being able to be represented as a variable of a specific data type, a first specific metadata including a specific description sentence being searched for from a set of metadata associated with a first global unique identifier, the method comprising the steps of:
entering said first global unique identifier and a second global unique identifier;
specifying a combination search of metadata including said first global unique identifier and metadata including said second global unique identifier;
capturing a set of metadata including said first global unique identifier or said second global unique identifier;
(a) holding said captured set of metadata and obtaining and presenting words at the beginning of description sentences included in said set of metadata;
(b) selecting and entering one word from said presented words;
(c) holding only said captured metadata having a description sentence including a word matching said entered word among said held metadata;
(d) obtaining and presenting a word from a description sentence of said held metadata, said obtained and presented word being at the position in the sequence next to said matching word;
(e) repeating said steps (b) through (d) until a word obtained at said step (d) is the last word of any description sentence of the held metadata;
said steps (a)-(e) being performed with a set of metadata including said first global unique identifier regarded as a set of captured metadata;
if the word selected at said step (b) is said variable: indicating that the metadata combination search is selectable; and selecting said combination search of metadata; and if said metadata combination search is selected:
capturing a second set of metadata including said first global unique identifier or second global unique identifier and including the same data type as said variable; and
searching for a second specific metadata based on a description sentence included in said held metadata in said second set of metadata.

4. The data search method according to claim 3 further comprising the steps of:
(f) presenting a metadata among the held metadata and the description sentence of which has the last word at said step (e) as the last word; steps (a)-(e) and (f) being performed with a second set of metadata regarded as a captured set of metadata;
(i) making a selection between determining that the metadata presented at said step (f) be said second specific metadata and again performing said steps (d), (e), and (f); and
(j) repeating said step (i) until said presented metadata is determined as said second specific metadata.

5. The data search method according to claim 4 further comprising the steps of:
(k) if said metadata combination search is selected, temporarily storing said held metadata and said variable; and
if said second specific metadata is located:
(l) reading said temporarily stored held metadata and said variable; and
capturing and presenting a word in a description sentence at the position next to the word which is represented by said variable, said description sentence from which said word is captured and presented being included in respective metadata in said held metadata.

6. The data search method according to claim 5 comprising the steps:
(m) making a selection between determining that metadata presented at said step f are said first specific metadata and further performing said steps (d) (e) and (f); and
(n) repeating said step (m) until said presented metadata is determined as said first specific metadata.

7. The data search method according to claim 6 further comprising the steps
displaying a first icon corresponding to said first global unique identifier; and
displaying a second icon corresponding to said second global unique identifier;
wherein said step of specifying a combination search of metadata comprises dragging-and-dropping one of said first icon and said second icon onto the other.

8. The data search method according to claim 3 further comprising the steps displaying a first icon corresponding to said first global unique identifier; and
displaying a second icon corresponding to said second global unique identifier;
wherein said step of specifying a combination search of metadata comprises dragging-and-dropping one of said first icon and said second icon onto the other.

9. The data search method according to claim 3 further comprising the steps of:
(k) if said metadata combination search is selected, temporarily storing said held metadata and said variable; and repeating steps (a)-(f) further comprises capturing and presenting a word in a description sentence at the position next to the word which is represented by said variable, said description sentence from which said word is captured and presented being included in said held metadata.

* * * * *

UNITED STATES PATENT AND TRADEMARK OFFICE
CERTIFICATE OF CORRECTION

| | |
|---|---|
| PATENT NO. | : 7,340,450 B2 |
| APPLICATION NO. | : 10/800038 |
| DATED | : March 4, 2008 |
| INVENTOR(S) | : Taro Sugahara et al. |

It is certified that error appears in the above-identified patent and that said Letters Patent is hereby corrected as shown below:

On the title page, item [73] Assignee: should read as follows:

HEWLETT-PACKARD COMPANY, Palo Alto, California and

NTT DOCOMO, Inc., Tokyo, Japan

Signed and Sealed this

Twenty-third Day of February, 2010

David J. Kappos
*Director of the United States Patent and Trademark Office*